United States Patent [19]

Mosher

[11] 4,042,810
[45] Aug. 16, 1977

[54] METHOD AND APPARATUS FOR FACILITATING CONTROL OF A RAILWAY TRAIN

[75] Inventor: John E. Mosher, Duncan, Okla.
[73] Assignee: Halliburton Company, Duncan, Okla.
[21] Appl. No.: 599,043
[22] Filed: July 25, 1975

Related U.S. Application Data

[63] Continuation of Ser. No. 436,700, Jan. 25, 1975.

[51] Int. Cl.$^2$ .......................... B61G 1/08; G06F 15/20
[52] U.S. Cl. ..................................... 235/150.2; 105/61
[58] Field of Search ........... 235/150.2, 150.24, 150.26; 105/61; 246/124; 340/47, 366 CA

[56] References Cited

U.S. PATENT DOCUMENTS

| | | | |
|---|---|---|---|
| 3,240,929 | 3/1966 | Hughson | 235/150.2 X |
| 3,639,731 | 2/1972 | McNeill | 235/150.2 X |
| 3,655,962 | 4/1972 | Koch | 235/150.2 X |
| 3,696,758 | 10/1972 | Godinez, Jr. | 105/61 |

OTHER PUBLICATIONS

The Train Handling Indicator; R. E. Tyler, a paper presented at the Association of American Railroads Conference on Track/Train Dynamics Interaction, Dec. 15, 1971, Chicago, pp. 452–463.
The Dynamics of the Locomotive Simulator; G. B. Adams, a paper presented at the Association of American Railroads Conference on Track/Train Dynamics Interaction, Dec. 15, 1971, Chicago, pp. 465–494.

*Primary Examiner*—Edward J. Wise
*Attorney, Agent, or Firm*—Burns, Doane, Swecker & Mathis

[57] ABSTRACT

A method and apparatus for facilitating control of a railway train, comprising at least one locomotive set and a plurality of articulated cars.

The method includes the steps of determining car consist and track profile information, dynamically determining velocity of the locomotive set and thus the entire train, dynamically monitoring train presence upon an underlying track, dynamically calculating coupling forces between each car throughout the extent of the train and displaying the thus determined train presence and car coupling forces within the cab of the locomotive to enable a locomotive engineman to more efficiently and reliably operate the train.

The apparatus includes track profile and car consist storing units and a means for determining velocity of the locomotive set. A general purpose digital computer is provided to receive the car consist information, track profile information, locomotive velocity and locomotive coupling force for dynamically determining train presence and calculating car coupling forces throughout the extent of the train as the train proceeds along the track. Train presence and the coupling forces throughout the train are then displayed to an engineman within the cab of the locomotive upon an electronic display screen to enable the engineman to more reliably and efficiently operate the train.

82 Claims, 35 Drawing Figures

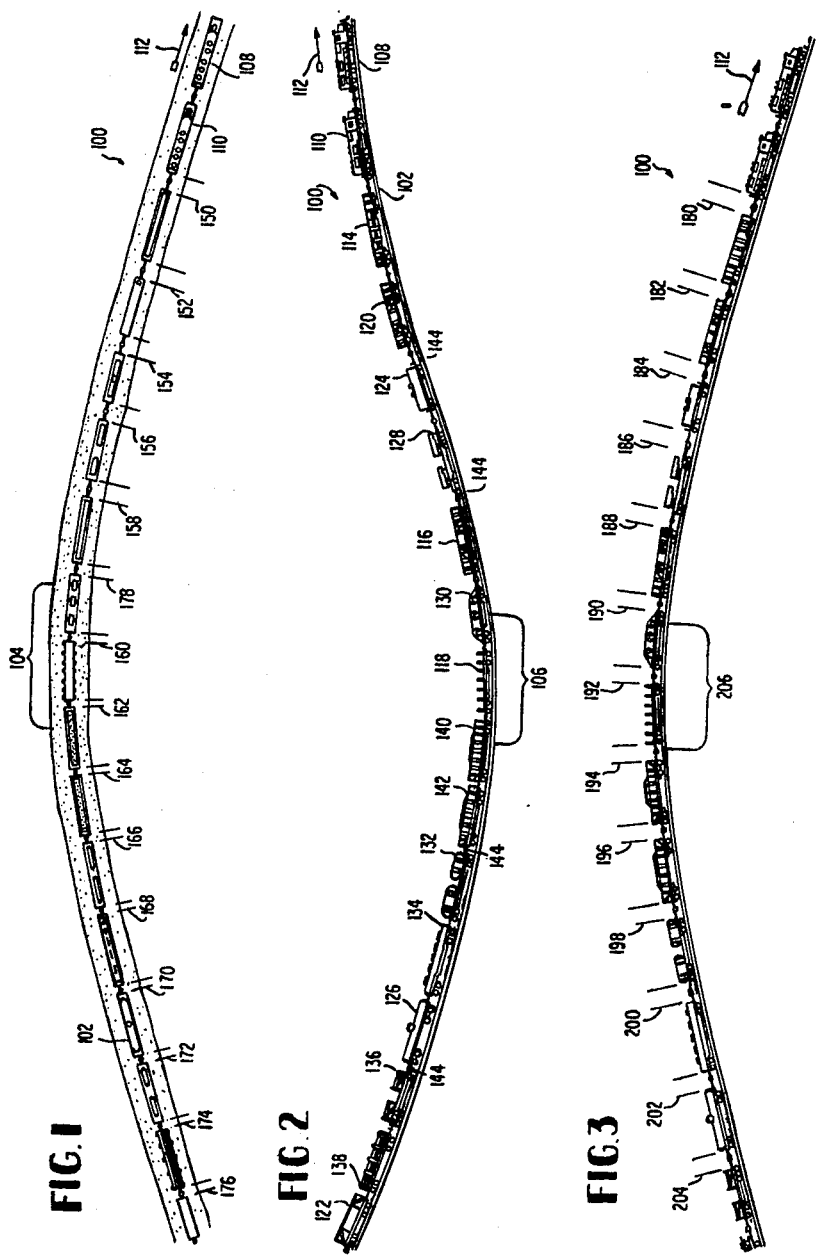

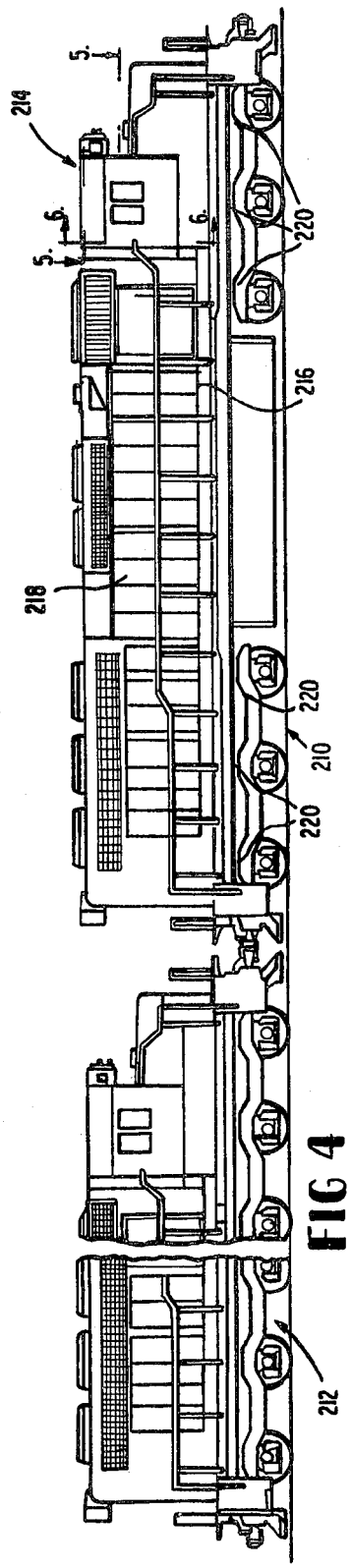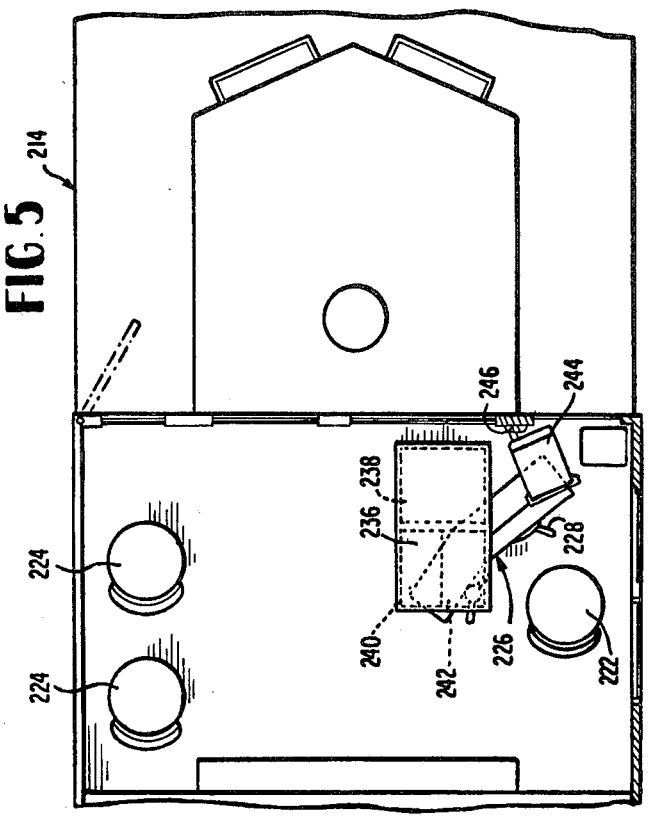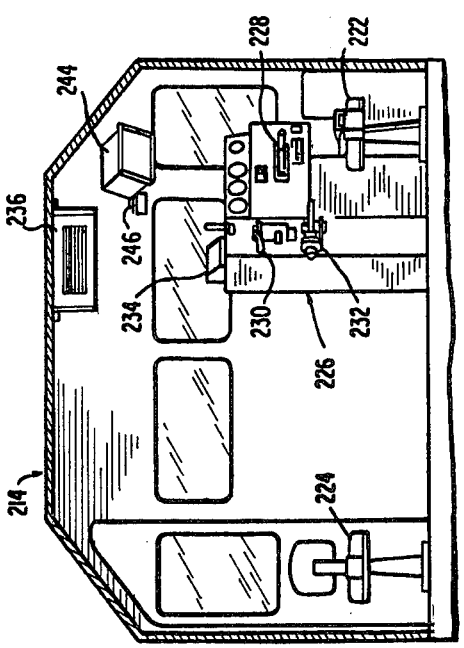

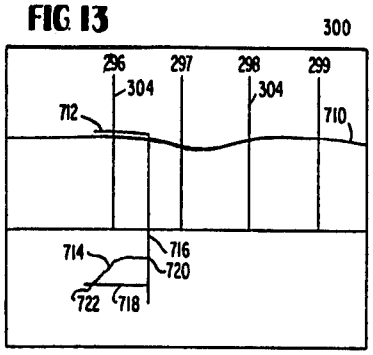
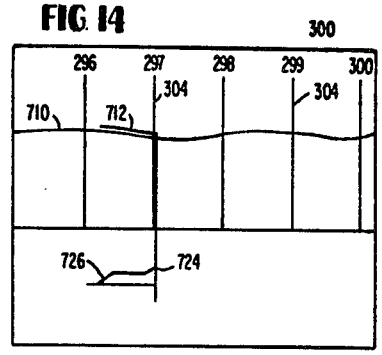
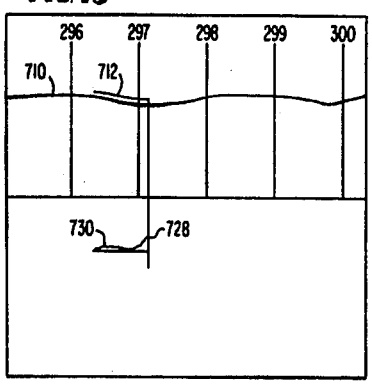
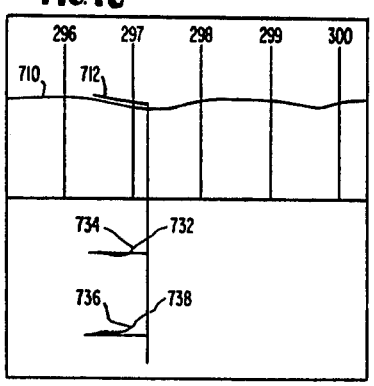
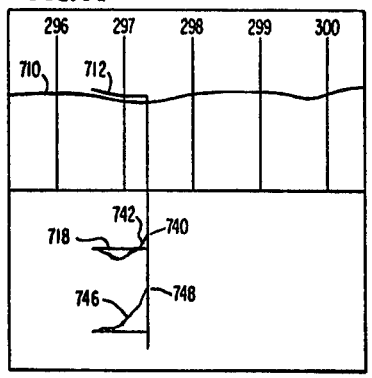
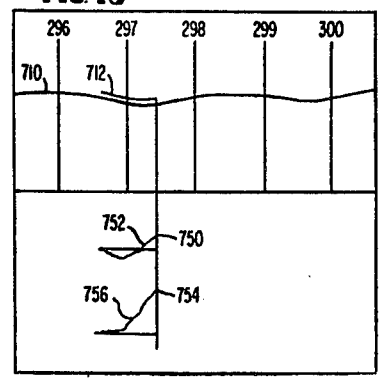

4,042,810

METHOD AND APPARATUS FOR FACILITATING CONTROL OF A RAILWAY TRAIN

This is a continuation, of application Ser. No. 436,700, filed Jan. 25, 1975.

BACKGROUND OF THE INVENTION

This invention pertains to a method and apparatus for facilitating the operation of railway trains. More specifically, the invention comprises a novel method and apparatus for dynamically monitoring car presence upon an underlying track profile and calculating car coupler forces throughout the extent of a train to provide an informational base for optimizing operation of the train over a predetermined route of travel.

In the infant stages of railroad technology locomotive pulling capabilities limited the length of trains to a few cars, such as 10 to 20, with corresponding relatively low maximum speeds on the order of 20 to 30 miles an hour. During this era even novice locomotive enginemen had little difficulty in controlling a train. In this connection the entire train could be effectively monitored merely by rearward observation from the locomotive cab. Efficiency around curves and on grades, as tempered by safe operational procedure, could be quickly acquired by a "seat of the pants" feel since the entire train essentially acted as a single unit wherein grade and curvature effects produced upon the locomotive were in essence concomitantly applied to the entire, relatively short, train.

Over the years, however, advances in railway engineering, such as the development of diesel electric locomotives utilized in multiple unit consists have advanced pulling capacities several magnitudes with respect to the early wood burning steam drive systems. This increase in pulling capacity has permitted marshaling longer and longer trains with higher and higher tonnage. It is no longer uncommon to encounter train consists of one hundred and fifty to two hundred cars stretching over a length of one, one and one-half to two miles.

In addition to the foregoing increases in train length and tonnage, a desire for increased operating efficiency has pushed operating speeds upward.

Unfortunately, with the foregoing noted increase in train lengths, tonnage and operating speeds, locomotive operational control equipment has remained substantially unchanged. In this connection enginemen still are operating trains to a large extent based upon a "seat of the pants" feel.

While experience and feel for train operational forces have remained the standard of the industry, efficiency can only be acquired after many years of experience over a well known run. In this regard it will readily be appreciated that human sensory perceptions as to grades, curves, etc. within a locomotive have little relevance to the end of a train one or two miles away. Further, gentle grades are often imperceptible to an engineman, although with long train lengths, high tonnage and elevated speeds, significant coupling forces may be produced between adjacent cars even on gentle grades.

It would therefore be highly desirable to provide a method and apparatus which would present a locomotive engineer or engineman with an accurate appreciation of track profile and relative train presence throughout the extent of the train, as the train proceeds along a predetermined route of travel. With this basic information available, it should be possible for even a relatively novice engineman, totally unfamiliar with the terrain of a particular run, to efficiently utilize grades to maintain optimum speeds and slack conditions as the train proceeds along the route of travel.

The above noted control difficulties are greatly accentuated when dynamic "train action" forces are considered. In this regard, train action or slack action events may be defined as a phenomenon which occurs as a consequence of the existence of slack in couplings between moving railway units. Such slack enables the units, during system travel, to undergo relative movement. Thus, train action denotes the equalization of speed of adjacent units which have undergone relative movement. A train action event is termed a "run-out" where adjacent units are moving apart. Where adjacent units are converging, the train action event is termed a "run-in".

There are numerous undesirable aspects associated with train action phenomena. During train action events shock forces are transmitted through the coupling units. These shock forces are propagated in a more or less wave form throughout the train. Such train action induced shocks are frequently severe enough to both damage goods carried by the trains and cause injury to train crewmen. Indeed train action induced forces may be severe enough to induce car partings and in some circumstances even derailment.

In the recent past, significant advances have been achieved in terms of obviating or minimizing the severity of slack action forces by the development of hydraulic cushioning units operable to be connected in series with car coupler shanks. Examples of such hydraulic cushioning units are disclosed in Seay U.S. Pat. No. 3,301,410, Blake U.S. Pat. No. 3,463,328, Seay U.S. Pat. No. 3,589,527, and Stephenson U.S. Pat. No. 3,589,528, all assigned to the assignee of the subject invention.

Notwithstanding, however, singular advances provided the railway industry by the development of hydraulic cushioning units, room for significant improvement remains in dealing with train action events.

In this latter connection it would be highly desirable to provide a method and apparatus for dynamically determining coupling forces throughout a train of widely varying consist as the train proceeds along a predetermined route of travel. With such force profile data an engineman may anticipate train action events so that appropriate preventive locomotive control may be initiated through appropriate application of the locomotive throttle, locomotive dynamic brakes, locomotive independent air brakes and/or automatic train brakes.

OBJECTS AND BRIEF SUMMARY OF THE INVENTION

Objects of the Invention

It is therefore a general object of the invention to provide a novel method and apparatus for facilitating control of a railway train which will obviate or minimize problems of the type previously described.

It is a further object of the invention to provide a novel method and apparatus for facilitating efficient operation of a railway train.

It is still a further object of the invention to provide a novel method and apparatus wherein a train may be efficiently operated over a widely varying terrain.

It is yet a further object of the invention to provide a novel method and apparatus wherein a relatively inexperienced engineman may effectively handle long trains even with widely varying consists.

It is yet another object of the invention to provide a novel method and apparatus wherein a locomotive engineman may improve performance of the train with reduced fuel consumption by optimizing the utilization of grades in achieving speed maintenance of the train.

It is another object of the invention to provide a novel method and apparatus wherein train operational indicia may be disclosed in substantial real time to an engineman within a locomotive cab whereby operation of the train may be effectively optimized.

It is still another object of the invention to provide a novel method and apparatus for facilitating safe and reliable operation of a train wherein the tendency for train partings and derailments are effectively minimized.

It is still yet another object of the invention to provide a novel method and apparatus wherein coupling forces throughout the length of the train may be dynamically calculated as the train proceeds along a predetermined route of travel.

It is yet still another object of the invention to provide a novel method and apparatus for dynamically displaying to an engineman within a locomotive cab real time train presence upon an underlying track profile and a coupling force profile throughout the extent of a train as the train proceeds along a predetermined route of travel.

It is a further object of the invention to provide a novel method and apparatus for facilitating effective operation of a train which is relatively inexpensive in initial installation and highly rugged and practical in operation.

It is yet a further object of the invention to provide a novel method and apparatus for recording and storing operational parameters of a train as the train proceeds along a predetermined route of travel.

BRIEF SUMMARY

A method for facilitating control of a train according to a preferred embodiment of the invention, intended to accomplish at least some of the foregoing objects, includes determining car consist information throughout the length of the train such as, for example, length of each car, average weight per axle for each car, total number of axles for each car and average cross-sectional area for each car. Track profile information is also determined, such as track grade and curvature for a predetermined route of travel. The velocity of the train is dynamically determined as it proceeds along the predetermined route of travel by measuring the velocity of the locomotive. Coupling forces between the locomotive and the first car of the plurality of articulated cars are dynamically determined by (1) direct measurement at the locomotive coupling shank; (2) measuring the main traction motor current and calculating locomotive coupling force; or (3) measuring main generator current and main generator voltage and calculating locomotive coupling force. The car consist information, track profile information, locomotive velocity and locomotive coupling force are input into a general purpose digital computer which dynamically calculates the coupling forces between each car throughout the extent of the train. This coupling force information along with the track profile and train presence is then projected upon an electronic display screen within the cab of the locomotive to facilitate operation of the train by an engineman.

The apparatus according to a preferred embodiment of the invention includes a means for storing car consist information and track profile information such as a magnetic or paper tape storage device. A means is provided for determining velocity of the locomotive such as measuring wheel rotation and correcting for wheel slip and creep, to compute the velocity of the train. Means is also provided for dynamically determining locomotive coupling force as the train proceeds along the predetermined route of travel. Such means may comprise: (1) a direct dynamometer measurement of coupling force on the locomotive coupler shank; (2) means for measuring traction motor current and calculating locomotive coupling force; or (3) means for measuring main generator current and main generator voltage and calculating coupler force. A general purpose digital computer is provided to receive input of car consist information, track profile information, locomotive velocity, and locomotive coupling force for calculating coupling force throughout the extent of the train. An electronic display screen is mounted within the cab of the locomotive and receives signals from the computer for providing traces of track profile, train presence upon the track profile, car coupler force distribution and other train information and operational instructions as desired.

THE DRAWINGS

Further objects and advantages of the invention will become apparent from the following detailed description taken in conjunction with the accompanying drawings, wherein:

FIG. 1 is a schematic plan view of a train including a locomotive set and a plurality of articulated cars coupled thereto composed of a widely varying consist;

FIG. 2 is a side elevational view of the train depicted in FIG. 1 and particularly discloses the train passing through a track grade depression wherein ascending cars are stretched and in tension while descending cars are bunched and in compression;

FIG. 3 is a side elevational view of the train depicted in FIGS. 1 and 2 as the train is proceeding over a knoll wherein descending cars are stretched and in tension and ascending cars are in like manner stretched and in tension;

FIG. 4 is a side elevational view of a diesel electric locomotive set or pair;

FIG. 5 is a cross-sectional view taken along section line 5—5 in FIG. 4 and discloses a plan view of the interior of the lead diesel electric locomotive depicted in FIG. 4;

FIG. 6 is a cross-sectional view taken along section line 6—6 in FIG. 4 and discloses an elevational, forward-looking, interior view of the cab of the diesel electric locomotive depicted in FIG. 4;

Figure 7:
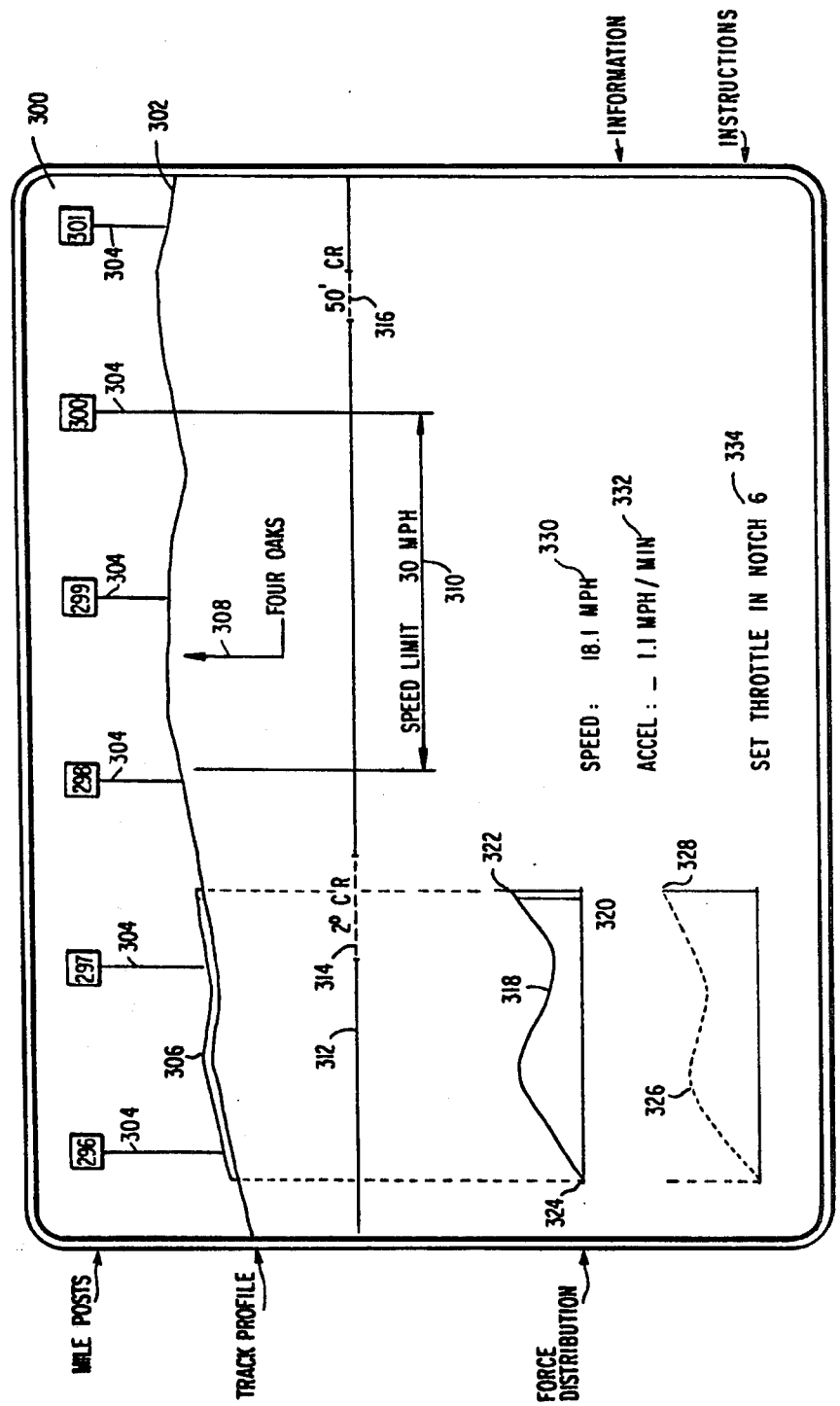
Figure 8:
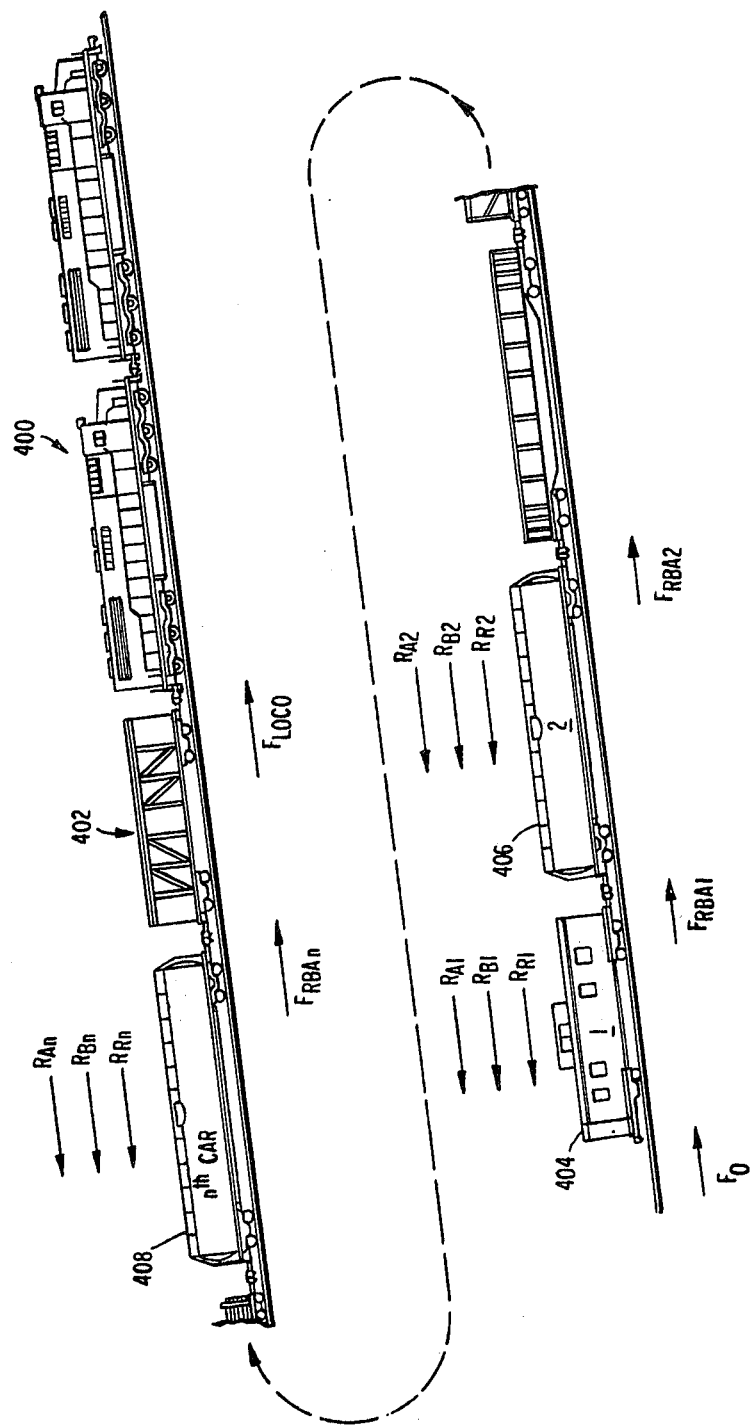
Figure 9:
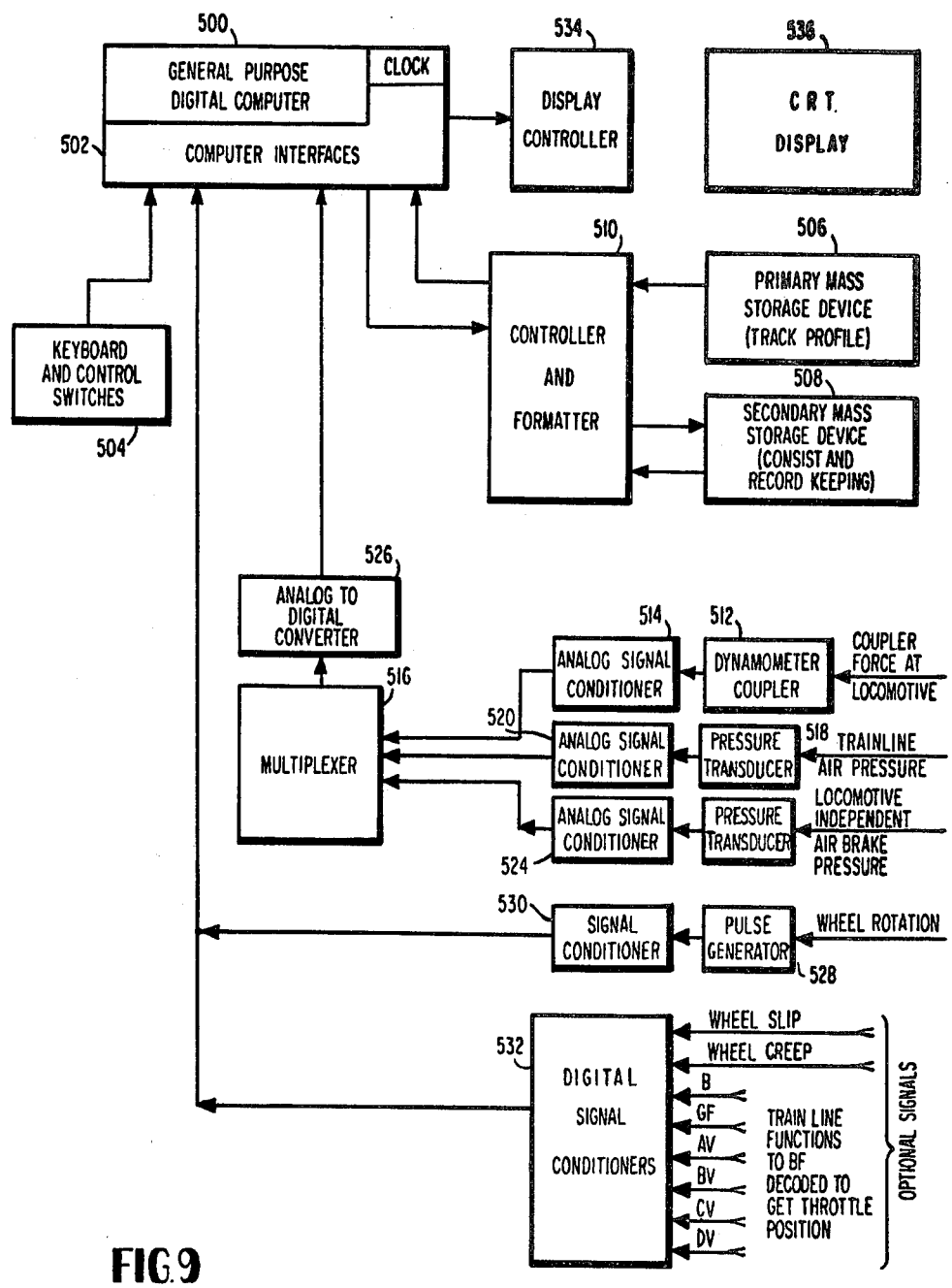
Figure 10:
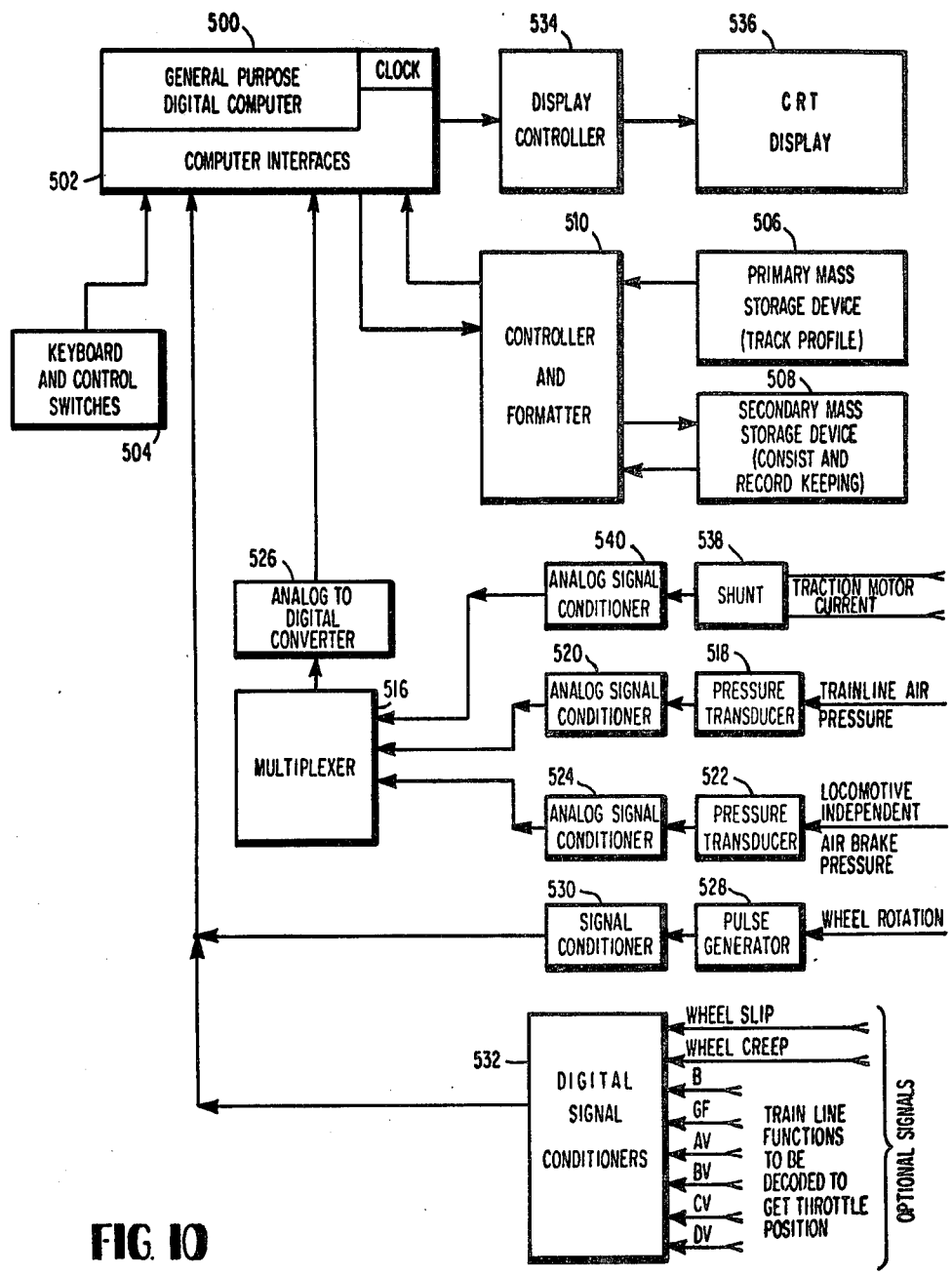
Figure 11:
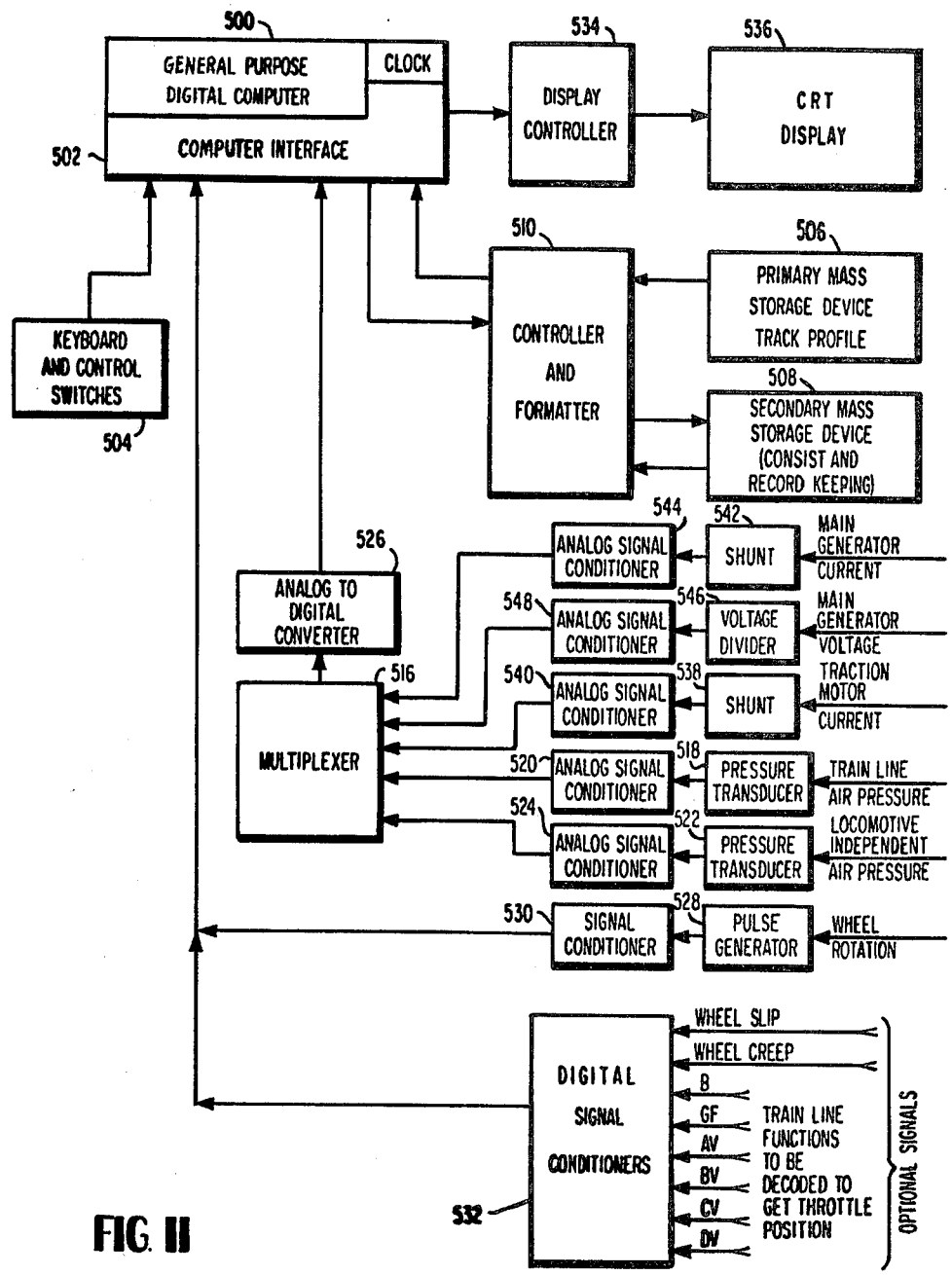
Figure 12A:
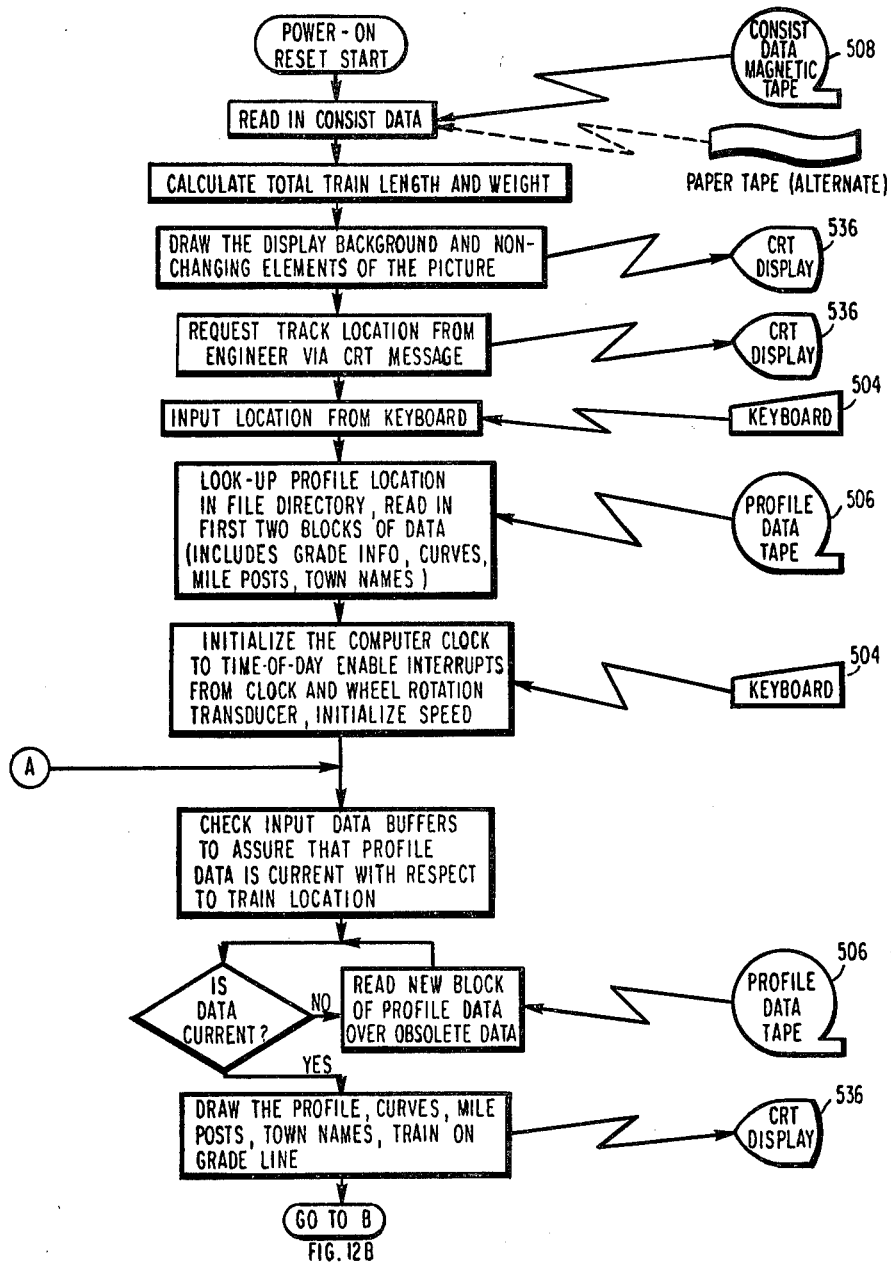
Figure 12:
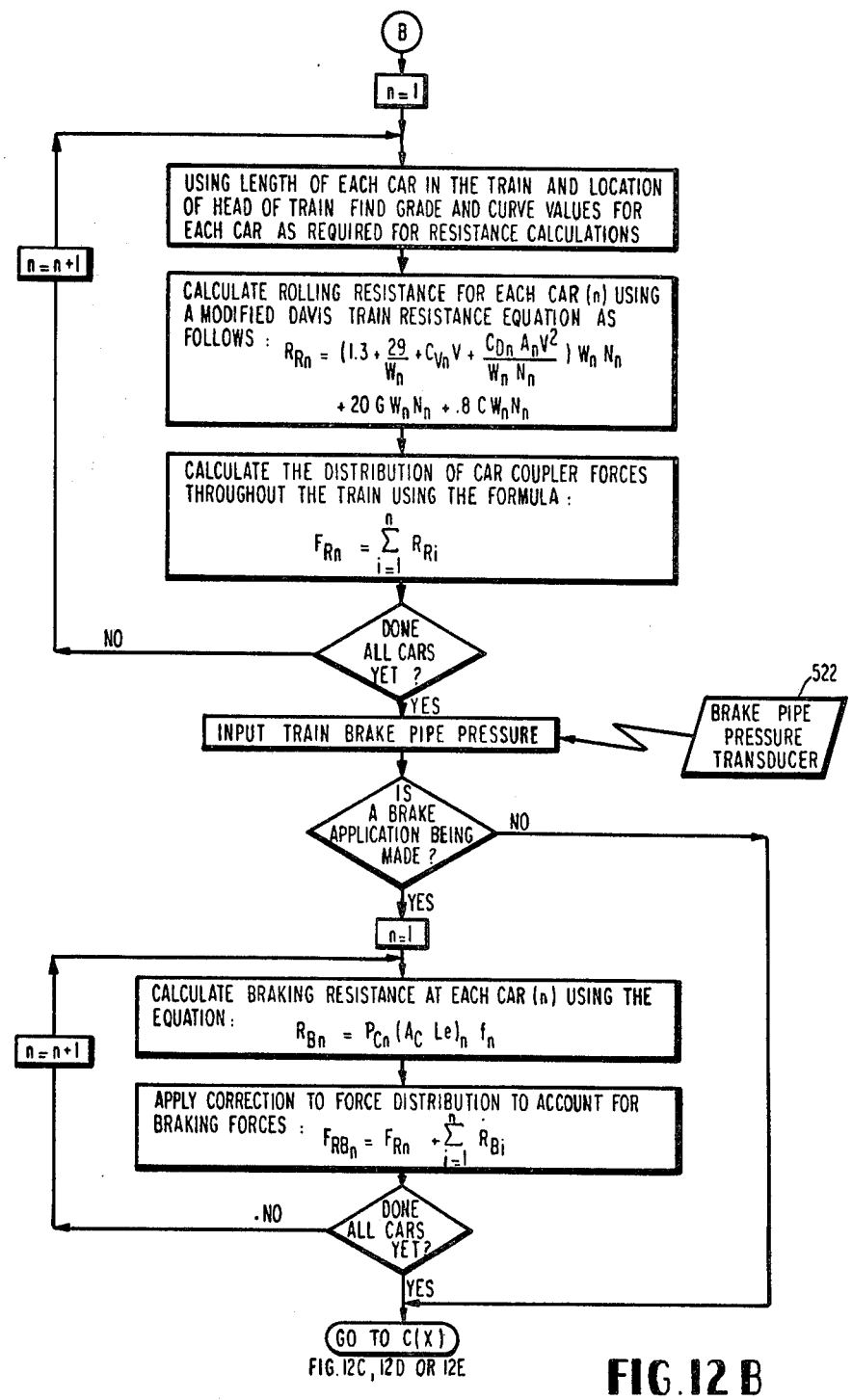

FIG. 7 is an illustrative plan view of a typical display according to a preferred embodiment of the subject invention wherein various indicia are depicted including a track grade profile and mile post indicators superimposed upon the track grade profile, a depiction of a train proceeding along the track grade profile, a track curve profile coextensive with the track grade profile, a calculated coupler force distribution between each of the plurality of articulated cars of the train, town locations upon the track grade profile, speed limit zones upon the track grade profile, and information and instructions for operating the train;

FIG. 8 depicts a train mathematical model indicating coupler forces and resistance forces of individual cars of the train;

FIG. 9 is a schematic block diagram according to a preferred embodiment of the invention wherein dynamically measured coupler forces between the locomotive and the next adjacent car of the train are utilized to compute forces between each car throughout the extent of the train and project the computed forces upon a cathode ray tube display within the cab of the locomotive;

FIG. 10 is a block diagram according to a first alternate preferred embodiment of the invention wherein locomotive traction motor current is utilized to dynamically compute forces between the locomotive and the next adjacent car of the train which in turn are utilized to compute individual coupling forces throughout the extent of the train and project the computed coupling forces upon a cathode ray tube display positioned within the cab of the locomotive;

FIG. 11 is a second alternate preferred embodiment of the invention wherein locomotive main generator current and main generator voltage are utilized to calculate locomotive coupling forces which in turn are utilized to compute individual coupling forces between each of the articulated cars throughout the extent of the train and project the computed coupling forces upon a cathode ray tube display positioned within the cab of the locomotive;

FIGS. 12 A-G comprise logic flow charts for each of the preferred embodiments of the invention for dynamically computing coupling forces between each car throughout the extent of the train and displaying the computed forces upon a cathode ray tube positioned within the cab of the locomotive; and FIGS. 13-29 disclose simplified cathode ray tube displays of a train proceeding along a track profile between mile posts 296 and 299 and computed car coupling force distributions throughout the extent of the train as the train proceeds along the predetermined route of travel.

DETAILED DESCRIPTION

Context of the Invention

Before discussing in detail preferred embodiments of the subject invention a brief background exposition of train action phenomena may be useful.

In this connection FIGS. 1 and 2 disclose plan and side elevational views respectively or a train 100 operably positioned upon an underlying roadbed and railway track 102. The horizontal profile discloses a general curvature or bend in the roadway. The track grade is depicted in FIG. 2 and comprises a slight depression or valley wherein a zone of maximum turning 104 in FIG. 1 generally coincides with a lowermost portion 106 of the grade profile.

The train is composed of first and second diesel electric locomotives 108 and 110 coupled in tandem into an operative pair for pulling a string of articulated railway cars in the general direction of arrow 112. In some instances mid-train locomotive units (not shown) may advantageously be utilized: however, for ease of illustration only forward or lead units are shown herein. The car consist of a typical train as depicted in FIGS. 1 and 2 includes randomly positioned cars of widely varying size, weight (both loaded and empty), and function.

More specifically the train consist may include gondola cars 114, 116 and 118, box cars 120 and 122, tank cars 124 and 126, a piggyback flat car 128, general purpose flat cars 130, 132, 134, 136 and 138, and hopper cars 140 and 142. It will be appreciated that the foregoing illustrative consist is entirely random and the lengths, weights, and cross-sectional area, and in some instances the number of axles, may vary from car to car.

The cars are interconnected with conventional coupling units 144 so as to produce an articulated train coupled behind the pulling locomotives 108 and 110.

The coupling unis 144 are typically connected to the car underframe sill structure through draft mechanisms. While friction and rubber draft gears having operative strokes of 2 to 4 inches are widely utilized, application of hydraulic cushioning units of the type previously noted is wide spread throughout the industry. These hydraulic cushioning units typically vary in stroke from 7 to 15 inches for each coupler shank. Thus in a composite coupling junction hydraulic draft units may provide 30 inches of cushioned travel from complete "run-out" to complete "run-in". Still further dimensional clearances within the coupling structures provides a few inches of play at each coupling junction.

Accordingly and as illustrated particularly in FIGS. 1 and 2, when cars of the train are ascending a grade such as the first five cars of the train 100, the couplers of ascending cars are typically placed in tension and the spacing between cars may be run-out or the draft gears will be fully extended, as illustrated by spacing lines 150, 152, 154, 156 and 158. As cars are descending a grade, however, there will be a tendency for the cars to close relative to one another and the cars will be run-in or the draft gears will be fully closed, as shown at 162, 164, 166, 168, 170, 172, 174, 176.

A transition zone exists where the cars may not be completely run-in or run-out. Such intermediate spacing is illustrated at 178 in FIG. 1 wherein the hydraulic cushioning units are capable of movement in either direction.

Run-in phenomena as previously noted are extremely undesirable train action events which may generate high compressive forces, components of which may be sufficient to lift or tend to lift a car at the lowermost portion of the track and thus present a potential derailment situation. This difficulty is greatly accentuated when a curve is encountered at a low portion of the track profile. In this connection a component of the compressive force will tend to push the car in zone 104 such that the wheel flanges will ride over the rails and derail the train. Furthermore, once a car is completely run-in it in essence becomes a solid mass with the next adjacent car. Accordingly, if ten or twenty cars are run-in the coupler force of a solid mass of steel ten or twenty cars long is input to the lead coupling. As a consequence of these blocks of cars acting as a single moving mass still higher forces can be developed greatly increasing the probability that a derailment might occur.

Referring now specifically to FIG. 3 a different type of undesirable train action is illustrated. In this connection the entire train 100 is run-out with maximum spacing 180, 182, 184, 186, 188, 190, 192, 194, 196, 198, 200, 202 and 204 at each coupling unit. With the entire train stretched and the locomotive proceeding on a downgrade, pulling force by the locomotive may generate tremendous tensile loads at the apex zone 206 of the track profile. Accordingly, as cars pass over this zone there is a distinct possibility of a train parting because of a broken knuckle in the coupler, sheared coupler pin or the like.

Train partings, while not as disastrous as derailments, are highly unacceptable to economic railroad management. In this connection, the front portion of the train must be backed up in order to repair the coupling and reestablish a connection. This work may tie up a track for extended periods. Since most lines are still multidirectional on one track, traffic will be tied up in both directions while the repairs are made, thus necessitating rescheduling, etc.

From the foregoing it will be appreciated that it would be highly desirable to be able to dynamically monitor car coupling forces and thus provide an informational base to minimize potential derailment and parting situations.

SYSTEM CONPONENTS

Referring now particularly to FIGS. 4, 5 and 6 of the drawings there will be seen views of a typical diesel electric locomotive set and interior sectional views of a locomotive cab employing components of the subject invention.

More particularly, a train consisting of 75 to 150 or more cars is typically pulled by two to five diesel electric locomotives 210 and 212 operating in tandem. Locomotive 210 is representative of locomotive 212 and is designed with a forward cab compartment 214, a main generator 216 and a diesel engine 218 operable to drive the generator. The generator supplies electricity to drive a series of six traction motors 220 connected through gearing to the wheels of the locomotive.

Looking within the cab 214, note FIGS. 5 and 6, there will be seen an engineman's sliding seat 222 and one or more auxiliary seats 224 for additional cab personnel. The engineman's chair is located adjacent to a control console 226. The control console includes a conventional eight notch throttle 228, train line air brake valve 230 and an independent locomotive air brake valve 232.

Positioned adjacent the control console 226 are components of the invention including an input keyboard located generally at 234, a ceiling suspended housing 236 which is designed to carry a general purpose digital computer at 238, a primary mass storage device at 240 and a secondary mass storage device at 242. Finally, a cathode ray tube display module is mounted upon the forward wall of the cab as at 244.

The operative interrelationships of the input keyboard, the computer, the primary and secondary mass storage devices and the display module will be more fully discussed hereinafter with reference to block diagrams and logic flow charts of FIGS. 9–12. Briefly, however, these components function to dynamically display train parameters such as vertical and horizontal track profiles, train presence relative to the profiles, coupling forces throughout the train, etc. to an engineman seated in chair 222 as the train proceeds along a predetermined route of travel.

ELECTRONIC DISPLAY SCREEN

Referring now to FIG. 7, there is shown an electronic display device 300 in accordance with a preferred embodiment of the invention. The electronic display device 300 is of a conventional design and may be, for example, a cathode ray tube (CRT) which may be scanned in any suitable conventional manner such as through the use of a raster scanning and intensity modulating technique or by oscilloscope type scanning techniques.

An initial track profile trace 302 is projected upon the screen and represents vertical grades of an undulating track along a predetermined route of travel. The grade profile 302 is intercepted at regular intervals 304 by vertical traces headed by sequential numeric representations 296–301 indicating mileposts along the predetermined route of travel. A train display 306 is projected upon the cathode ray screen in a posture overlying the track profile and represents the length and position or presence of the train with respect to the track profile. Still further, town locations 308, speed limit zones 310, etc. may be superimposed upon the track profile 302.

In addition to the foregoing vertical track profile, horizontal curve profile information is depicted by trace 312 wherein curves are dotted as at 314 and 316 with a numerical degree of curvature identified as 2° CR and 50 minutes CR, respectively.

Underlying the train profile 306 is a car coupler force profile 318. A zero force ordinate 320 is projected coextensive with the coupler force profile. As illustrated in FIG. 7, therefore, the coupler forces between adjacent cars throughout the entire train are positive values and the entire train is stretched. The initial value as at 322 represents the coupling force between the locomotive and the next adjacent car while the final value at 324 represents the force of the last car which must necessarily be zero.

In some instances, it may be desirable to represent a second, hypothetical car coupler force profile 326 which depicts a calculated force profile throughout the extent of the train in the event a hypothetical locomotive coupling force were imposed upon the first car as at 328 instead of the actual coupling force 322. This hypothetical force profile may be useful in depicting what pulling force is required in order to maintain the coupling force profile throughout the extent of the train as a positive value of above the ordinate.

Additionally, train operational information and instructions may be alphanumerically displayed upon the screen 300. In this connection, operational information such as current train speed 300 and calculated train acceleration 332 after a certain distance is traversed with a particular throttle setting and track profile may be useful to an engineman is the operation of the train. Further instructions 334, such as proper throttle notch setting to minimize train action events, critical minimum speeds necessary to avoid harmonic car oscillations, etc. may be displayed to an engineman.

The foregoing indicia depicted in FIG. 7 are not meant to be exhaustive and one skilled in the art will be able to further supplement, this visual display to a locomotive engineer in order to effectuate a more efficient and reliable operation of the train.

MATHEMATICAL MODEL

In accordance with a preferred embodiment of the subject invention it has been determined that a car coupler force distribution profile may be mathematically calculated throughout a train with sufficient accuracy to be of substantial utility in anticipating and thus minimizing train action events. In order to fully appreciate the development of mathematical approximations for coupling force between each car a model may be useful, such as illustrated in FIG. 8, wherein a lead locomotive set 400 is coupled to an articulated string of cars 402.

The cars may be referenced in sequential numeric order taking the caboose 404 as car 1 and proceeding toward the locomotive set 400.

The caboose 404 is not coupled to a further car thus the coupling force at the end of the caboose $F_o$ is equal to zero. The coupling force at the lead end of the caboose or first car is equal to a summation of the resistance forces of the caboose to forward motion. These forces may be approximated by a rolling resistance factor $R_R$, a braking resistance factor $R_B$ and an acceleration resistance $R_A$.

Rolling resistance $R_R$ includes such factors as (a) rolling friction between wheel and rail; (b) axle bearing friction; (c) flange friction which varies with speed; (d) air resistance; (e) track grade resistance and (f) track curvature resistance.

Braking resistance $R_B$ is a factor applicable when individual brake shoes mounted upon each car are applied. Under many running conditions the individual car brake shoes will not be applied and this factor will accordingly be zero.

Acceleration resistance $R_A$ is a factor which is required to produce accelerated translation of the car and accelerated rotation of the car wheels about their axle centers.

In equation form such forces for the caboose or first car may be represented as follows:

$$F_{RBA1} = R_{R1} + R_{B1} + R_{A1}.$$

In a similar vein the coupling force at the lead end of the second car 406 is equal to a summation of the resistance forces of the caboose and the resistance forces of the second car to forward motion. In equation form such forces may be represented as follows:

$$F_{RBA2} = (R_{R1} + R_{B1} + R_{A1}) + (R_{R2} + R_{B2} + R_{A2})$$
$$= (R_{R1} + R_{R2}) + (R_{B1} + R_{B2}) + (R_{A1} + R_{A2}).$$

Generalizing for an $n^{th}$ car the equation becomes:

$$F_{RBAn} = \sum_{i=1}^{n} R_{Ri} + \sum_{i=1}^{n} R_{Bi} + \sum_{i=1}^{n} R_{Ai}. \quad (1)$$

A numeric factor for rolling resistance $F_R$ for an $n^{th}$ car may be calculated from a modified Davis train resistance formula as follows:

$$R_{Rn} = (1.3 + (29/W_n) = C_{Vn}V + (C_{Dn}A_n V^2/W_n N_n)) \quad (2)$$
$$W_n N_n + 20 G_n W_n N_n + 0.8 C_n W_n N_n.$$

wherein:
$R_{Rn}$ = rolling resistance of the $n^{th}$ car, pounds
$W_n$ = average weight per axle of the $n^{th}$ car, tons;
$C_{rn}$ = coefficient of rolling resistance of the $n^{th}$ car, typically 0.030 to 0.045;
V = speed, assumed to be the same throughout the length of the train, mph;
$C_{Dn}$ = wind resistance drag coefficient of the $n^{th}$ car, typically 0.0003 to 0.003;
$A_n$ = cross-sectional area of the front of the $n^{th}$ car, sq. ft.;
$N_n$ = total number of axles of the $n^{th}$ car; and
$G_n$ = ascent or descent in feet-in-one-hundred or percent grade beneath the $n^{th}$ car; and
$C_n$ = track curvature in degrees beneath the $n^{th}$ car.

Using such parameters as the length of each car together with the location of the train on the track, the grade and curvature for the track under each car can be determined from recorded track profile data over a predetermined route of travel.

The braking resistance factor $R_B$ may be estimated for those circumstances when the train brakes are in application. The braking force on the $n^{th}$ car may be numerically determined by:

$$R_{Bn} = P_{cn}(A_c L e)_n f_n \quad (3)$$

wherein:
$R_{Bn}$ = train braking resistance of the $n^{th}$ car, pounds;
$P_{cn}$ = brake cylinder pressure of the $n^{th}$ car, psi;
$A_c$ = brake cylinder piston area of the $n^{th}$ car, sq. in.;
L = brake lever mechanical advantage of the $n^{th}$ car;
e = brake rigging efficiency of the $n^{th}$ car; and
f = brake shoe to wheel coefficient of friction of the $n^{th}$ car.

It should be noted that the factors $A_c$, L and e can be prespecified as an average parameter for each car. The coefficient of friction is a function of car speed, type of brake shoe and wheel temperature. The coefficient of friction can be determined using empirical relationships available from manufacturers of car brake equipment.

The brake cylinder pressure $P_{cn}$ is a function of the relatively recent history of the train line air pressure which is measured at the lead locomotive and used as required to predict the state of application of the train brakes. Empirical relationships describing the buildup of pressure at each brake cylinder have also been established by manufacturers of car brake equipment.

In determining the acceleration resistance an assumption is made that the entire train accelerates equally. With this initial assumption, the pulling force for the entire train between the locomotive set 400 and the next adjacent car less the total rolling and train braking resistance of the train is equal to the total effective mass of the train times the acceleration. In equation form this relationship may be indicated as follows:

$$F_{loco} - \left( \sum_{i=1}^{total} R_{Ri} + \sum_{i=1}^{total} R_{Bi} \right) = \left( \sum_{i=1}^{total} M_{ei} \right) a \text{ or}$$

$$a = (F_{loco} - \left( \sum_{i=1}^{total} R_{Ri} + \sum_{i=1}^{total} R_{Bi} \right)) / \sum_{i=1}^{total} M_{ei}.$$

A numeric acceleration term $R_A$ for an $n^{th}$ car may be determined as follows:

$$R_{An} = a(M_{cn} \text{effective}) \quad (4)$$

$$= \frac{(F_{loco} - (\sum_{i=1}^{total} R_{Ri} + \sum_{i=1}^{total} R_{Bi})) M_{cn}}{\sum_{i=1}^{total} M_{ei}}$$

wherein:
$F_{loco}$ = coupling force between the locomotive and the adjacent car of the train
$R_R$ = the rolling resistance of each car as determined by equation (2);
$R_B$ = the train braking resistance of each car as determined by equation (3);
$W_n$ = average weight per axle of the $n^{th}$ car;
$N_n$ = total number of axles of the $n^{th}$ car; and
$M_{en}$ = the effective mass of the $n^{th}$ car which includes a factor for translation acceleration and a factor for wheel rotation acceleraton; = 91.05 $W_n N_n$ + 36.36$N_n$.

From the foregoing the coupling force between each car $F_{RBAn}$ may be computed from equation (1). While the foregoing equations have been developed on the basis of lead locomotives only, those skilled in the art will be able to alter these equations to account for one or more midtrain locomotive units.

SYSTEM DESCRIPTION

One preferred system for dynamically analyzing the operation of a train and facilitating control of the train in response to the analysis is illustrated in FIG. 9. More specifically, a general purpose digital computer 500 (shown at 238 in FIG. 5) is coupled through conventional computer interfaces 502 with various data input and output devices described hereinafter.

An input keyboard and various control switches 501 (shown at 234 in FIG. 6) provide communication between the train engineman and the digital computer 500 through the computer interfaces 502. The keyboard may be, for example, a conventional push button telephone keyboard and the contol switches may permit the engineman to select various system options and perform control functions in a conventional manner.

In addition to the data storage capacity provided by the computer 500, primary and secondary mass storage devices 506 and 508 (shown at 240 and 242 in FIG. 5) may communicate with the digital computer 500 through a conventional controller and formatter 510 and the computer interfaces 502. The mass storage devices 506 and 508 may be for example, magnetic or paper tape storage units and may be used to store track profile and consist data obtained prior to a given run and record and store, for subsequent evaluation, selected operational data of the train as it proceeds along a route of travel.

The controller and formatter 510 functions to control the transfer of data between the computer 500 and the storage devices 506 and 508 in response to commands from the computer 500. The controller and formatter 510 also insures proper formatting of the data transferred from the computer 500 and the storage devices 506 and 508. The controller and formatter 510 may be any suitable conventional device capable of performing functions in conjunction with the particular computer and the storage devices being employed. Such units are typically available from either the computer manufactuerer and/or the supplier of the storage devices.

In the embodiment of the invention illustrated in FIG. 9, the previously discussed (note Mathematical Model section) locomotive pulling or coupling force ($F_{loco}$) is preferably determined in response to a direct measurement of force exerted on the coupler shank between the locomotive and the next adjacent car. To provide this measured force, a conventional dynamometer coupler 512 is mounted upon the coupler shank to provide an output signal related to the locomotive consist pulling or braking force exerted upon the cars of the train. The output signal from the dynamometer coupler 512 is fed into a suitable analog signal conditioner 514 for amplifying and filtering. The amplified and filtered output signal from the analog signal conditioner 514 is then applied to a suitable conventional selective signal scanning device such as a multiplexer 516.

Similarly, the train line air pressure, used in determining car braking resistance ($R_B$), may be sensed by a suitable conventional pressure transducer 518 and supplied through another analog signal conditioner 520 to the multiplexer 516.

For record keeping purposes, locomotive independent air brake pressure may be sensed by a suitable conventional pressure transducer 522 and supplied to the multiplexer 516 through an analog signal conditioner 524.

The multiplexer 516 may be controlled in any suitable conventional manner by the computer 500 to supply the conditioned output signals from the dynamometer coupler 512 and the pressure transducers 518 and 522 to the digital computer 500 as required during the operations performed by the computer. For example, each of the signals may be continuously supplied to the multiplexer 516. When a particular signal is required in a computation, the computer 500 may address the appropriate intput signal and gate that signal through the multiplexer 516. Since the force and pressure related signals are analog signals in the illustrated embodiment, an analog to digital converter 526 is provided to convert the analog signals to a digital format compatible with the digital computer 500.

Other quantities utilized in the calculation of force distribution and further optional or additional functions performed by the digital computer 500 may be supplied in any suitable conventional manner. For example, information as to the train velocity may be supplied from a conventional pulse generator 528 driven by wheel rotation of the locomotive. The rate of pulse input from the pulse generator 528 is directly indicative of train velocity and may be appropriately conditioned by a suitable digital signal conditioner 530 and made available to the computer 500 for use in the calculations as required. The digital signal conditioner 530 may be any suitable conventional circuit for isolating any undesirable variables contained in the pulse generator signal from the computer 500. For example, the pulse generator 528 may be a conventional digital tachometer which generates pulses having varying amplitudes. Since the computer 500 requires binary signals having a relatively constant, low voltage level (e.g., 5 volts d.c.) the signal conditioner 530 may eliminate the variations in d.c. level of the pulses from the pulse generator 528 through a suitable coupling technique such as through the use of light emitting diodes which couple only the binary information of the pulses to the computer 500.

Other signals indicative of quantities such as wheel slip and wheel creep are used to correct velocity and location calculations, and various train line functions used, for example, to record throttle operation by an engineman may also be provided through similar digital signal conditioners generally indicated at 532.

In a preferred embodiment of the invention, the distribution of car coupler forces in the train is preferably displayed through an electronic scanning technique. Accordingly, data defining the information to be displayed is applied through a conventional display controller 534 to an electronic display 536 such as a cathode ray tube (CRT) as previously mentioned in connection with FIGS. 5-7.

The display 536 may be an oscilloscope display wherein the vertical and horizontal positions of an electron beam are controlled to generate the display or alternatively a raster scan type of display wherein the intensity of a regularly scanned beam is controlled to generate the display. Assuming that an oscilloscope type of display is employed, the display controller 53 may be provided with X and Y coordinates of discrete points which together define the desired display. From these discrete points, the display controller may generate suitable horizontal and vertical deflection signals of an analog nature to deflect the electron beam of the display device along a path defining the desired display. Additionally, blanking signals may be generated to blank the beam at appropriate X and Y values along a scan line.

If a raster scan display device is utilized, the X, Y and Z intensity values of discrete points defining the desired display may be stored by the display controller and utilized to vary the intensity of the scanned electron beam in coordination with the vertical and horizontal scanning signals of the display device. For example, all of the stored points may be stored in order as to their X positions (i.e., the order of raster line on the display device), and for each raster line having more than one point thereon, may be ordered in accordance with the Y or horizontal value along that raster line. When the beam of the display device reaches a particular X, Y value corresponding to a point to be displayed the display controller may then modulate the intensity of the beam in accordance with the stored Z value of that point. Such display techniques are conventional and therefore will not be described in further detail.

FIG. 10 illustrates another embodiment of the present invention wherein locomotive pulling force $F_{loco}$ is calculated as a function of the locomotive traction motor current as will be described more fully hereinafter. In the embodiment of FIG. 10, traction motor current may be monitored in a suitable conventional manner by shunting a portion of the traction motor current through shunt 538. The signal related to traction motor current may be provided from the shunt 538 through a suitable analog signal conditioner 540 to the multiplexer 516 for use by the computer 500. The remaining system components illustrated in FIG. 10 preferably are the same as those described in connection with FIG. 9.

FIG. 11 illustrates still another embodiment of the present invention wherein locomotive pulling force $F_{loco}$ is calculated as a function of main generator voltage, main generator current and, in the event locomotive dynamic braking is being applied, as a function of traction motor current. Main generator current may be monitored through the use of a suitable shunt 542 or in any other manner compatible with the type of main generator employed in the locomotive consist. The signal related to main generator current may be supplied from the shunt 542 through an analog signal conditioner 544 to the multiplexer 516 for use by the computer 500 as required. Main generator voltage may be monitored across a suitable voltage divider 546. An output signal from the voltage divider 546 is then input to a suitable analog signal conditioner 548 and onto the multiplexer 516 for use by the computer 500. Traction motor current may be monitored as previously described in connection with FIG. 10.

The remaining system components illustrated in FIG. 11 are preferably the same as those described in connection with FIG. 9.

The computer 500 of FIGS. 9, 10 and 111 may be any suitable conventional general purpose digital computer interfaced with external input/output devices in any suitable conventional manner and suitably programmed to perform the functions described herein. One example of a compact digital computer which is suitable for the subject system is a Naked Mini $^{T.M.}$ 16 produced by Computer Automation, Inc. of Irvine, California 92664. To facilitate an understanding of the operation of the computer 500 in conjunction with the input/output devices previously described in connection with FIGS. 9-11, reference may be had to the flow diagrams of FIGS. 12A-12G.

SYSTEM OPERATION

Referring now to FIG. 12A, consist data relating to the physical structure of the train (e.g., car type, lading weight, etc.) may be supplied to the computer from a suitable memory or data storage medium 508 such as a magnetic or paper tape. The car type data may be used by the computer as required to locate resistance coefficients and car parameters stored permanently in the computer in a table form. The consist data may then be initially used to calculate a total train length and weight.

The computer may now draw a display background and nonchanging elements of the output display on the cathode ray tube. The computer may then request track location from the engineer by displaying a track location request on the cathode ray tube (CRT) display 536. The engineman may then supply the current track location of the train to the computer by way of the keyboard 504.

With the train location established, data relating to the vertical and horizontal profile of the track at the established location may read from a profile data tape or other suitable memory 506. The operator may then initialize the computer clock to the current time of day through the use of the keyboard 504 and train speed may be initialized either automatically or by way of the keyboard 504. The initialized speed quantity may thereafter be periodically undated as will be described hereinafter. The computer is then ready to perform the train coupler force analysis.

Input data buffers in the main computer memory may contain data from the external input devices and may be periodically checked to assure that the profile data is current with respect to the current train location. If the data is not current, a new block of profile data is read from the memory 506. When the profile data is current, the track profile, track curves, mile posts, town names and the train trace are drawn on the CRT display.

The distribution of car coupling forces throughout the train may next be calculated for each car (n) by first setting the value of n at 1 (first car) as is shown in FIG. 12B. Using the data as to the length of each car in the train and the location of the head of the train the grade and curve values are determined for each car from the track profile data for use in resistance calculations. The rolling resistance calculations for a car $R_{Rn}$ may be performed from the car data, train velocity, grade and curve values by using a modified Davis train resistance equation as previously discussed in the Mathematical Model section, note equation (2). The calculation of each car rolling resistance value is repeated until the car coupler force values are available for all n cars. The computer then continues in accordance with FIG. 12B.

With continued reference to FIG. 12B, the brake pipe pressure transducer 522 provides trainline air pipe pressure as requested by the computer and if a car braking application is being made, the braking resistance $R_B$ for each car is calculated as set forth in the Mathematical Model section, note equation (3).

Rolling resistance forces $F_{Rn}$ are then corrected to account for these braking forces $F_{Bn}$ to provide a corrected coupler force $F_{RBn}$ at each car.

After the distribution of rolling resistance forces in the train have been computed and corrected for braking forces, the computer proceeds to determine an acceleration resistance factor $R_A$ by first determining locomotive pulling force $F_{loco}$ by one of the three alternative techniques previously described in connection with FIGS. 9, 10 and 11.

Figure 12C:
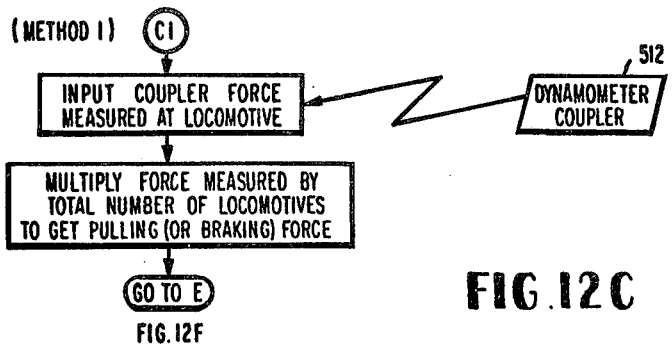

In this connection and with reference to FIG. 12C, a first method of determining locomotive pulling force is illustrated. The force between the lead locomotive and the next adjacent unit of the train may be directly measured by a dynamometer coupler 512 as previously described in connection with FIG. 9. This force measured by the dynamometer coupler may be multiplied by the total number of locomotives to get a total pulling (or braking) force $F_{loco}$. The computer may then continue with the calculations as illustrated and described hereinafter in connection with FIG. 12F and 12G to determine car acceleration resistance values $R_{An}$ (note equation (4) in mathematical model section).

Figure 12D:
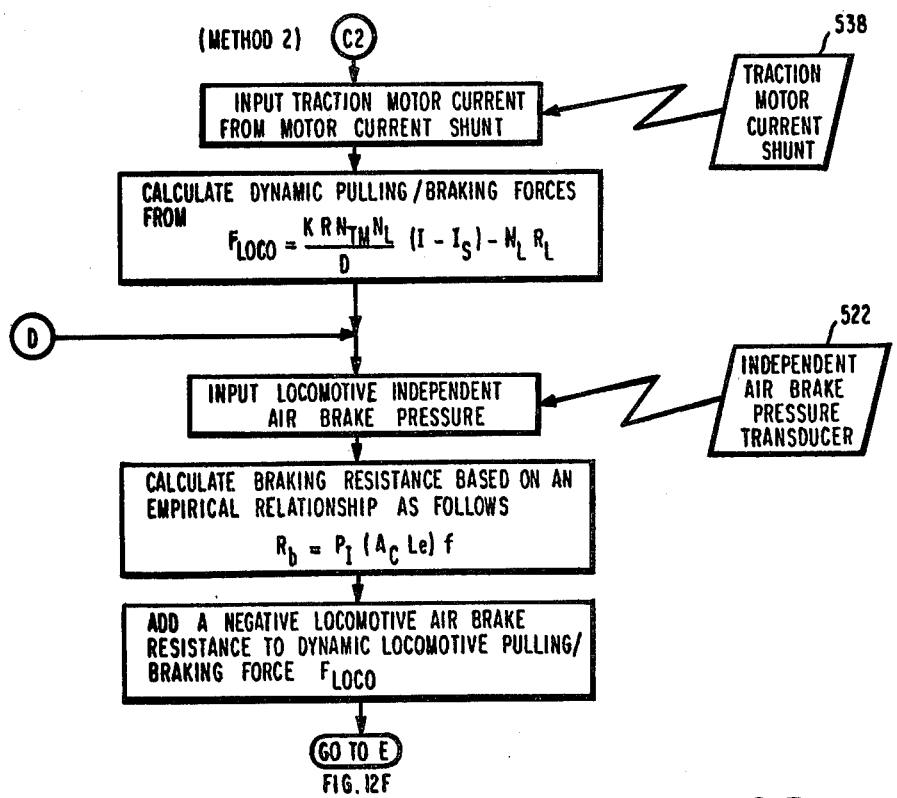

Another way in which the locomotive pulling force $F_{loco}$ may be determined is illustrated in FIG. 12D. In this connection, a signal from the traction motor current shunt 538 may be provided to the computer as previously described in connection with FIG. 10 and the pulling force $F_{loco}$ may be calculated in accordance with the following equation:

$$F_{loco} = \frac{KRN_{TM}N_L}{D}(I-I_s) - N_L R_L$$

wherein:
- $K$ = constant coefficient for particular type of tractor motor;
- $R$ = traction motor gear ratio (typically 65/15);
- $N_{TM}$ = number of operating traction motors;
- $N_L$ = number of locomotives of this type in consist;
- $R_L$ = running resistance of each locomotive;
- $I$ = traction motor current;
- $I_S$ = motor current corresponding to zero motor torque; and
- $D$ = wheel diameter.

Of the foregoing listed quantities employed in the calculation of the net pulling force of the locomotives, all but traction motor current are predetermined quantities for a particular train and may be prestored in computer memory. Traction motor current may be supplied to the computer as required for the calculation of $F_{loco}$ as was previously described.

As a refinement or correction factor to $F_{loco}$ the computer may be supplied with information as to locomotive independent air brake pressure from the transducer 522, with speed information from the wheel rotation pulse generator 528 and with constant data. Locomotive braking resistance $R_b$ may then be calculated in accordance with the following equation:

$$R_b = P_I(A_c Le)f$$

wherein:
- $P_I$ = locomotive independent air brake pressure;
- $A_c$ = brake cylinder piston area of the $n^{th}$ car, sq. in.;
- $L$ = brake lever mechanical advantage of the $n^{th}$ car;
- $e$ = brake rigging efficiency of the $n^{th}$ car; and
- $f$ = brake shoe to wheel coefficient of friction of the $n^{th}$ car.

It should be noted that the factors $A_c$, $L$ and $e$ can be lumped together and prespecified as a single coefficient for each locomotive. The coefficient of friction f as a function of speed would be determined from an empirical relationship according to the type of brake shoes on the locomotive.

A negative independent locomotive air braking resistance $R_b$ is then added to the uncorrected $F_{loco}$ to provide an actual locomotive pulling (or braking) force $F_{loco}$. The computer may then continue to the functions illustrated in FIGS. 12F-12G and calculate car acceleration resistance $R_{An}$ (note equation (4)).

Figures 12E, 12F:
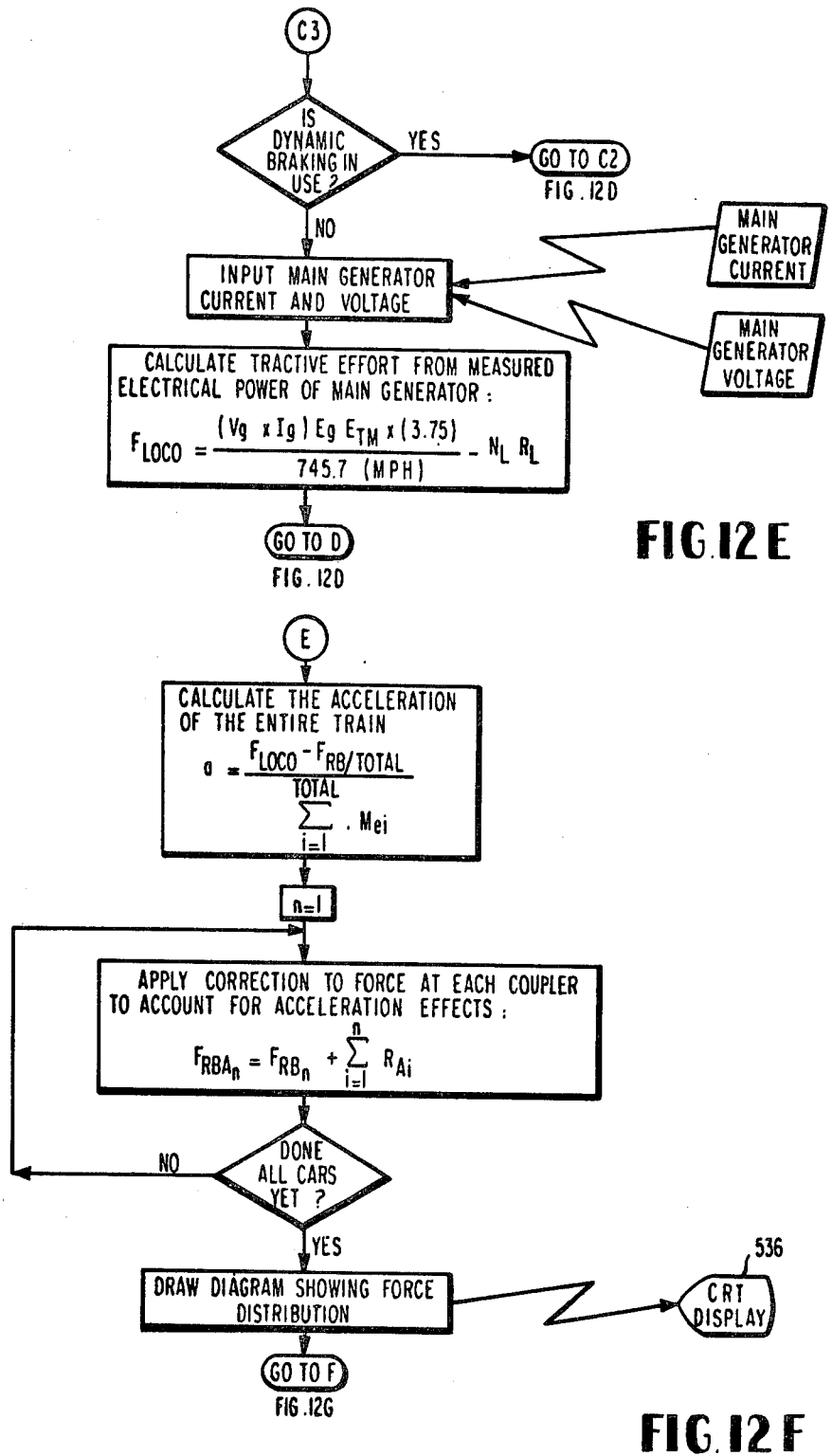
Figure 12:
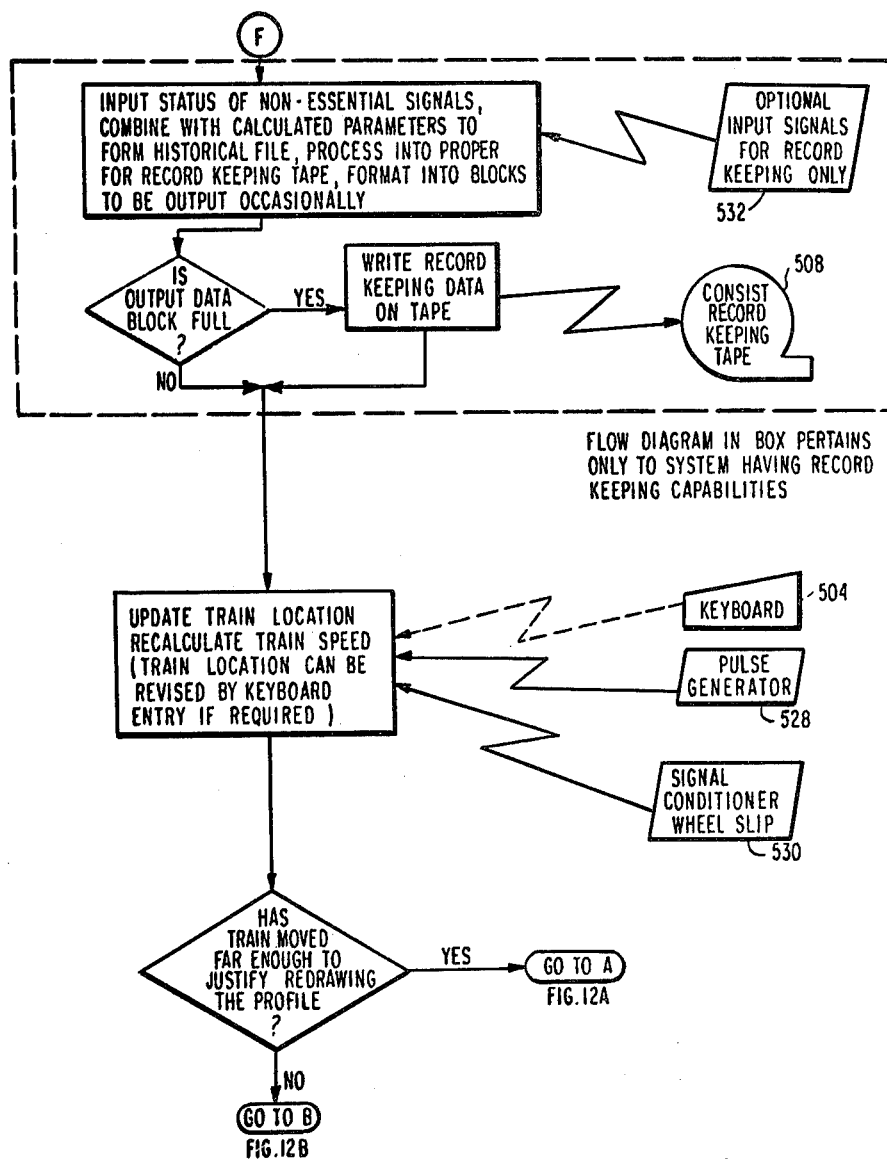

A third technique for calculating the locomotive pulling force is illustrated in FIG. 12E. If dynamic braking is in use, the net locomotive braking force $F_{loco}$ may be calculated in response to traction motor current as was previously described in connection with FIG. 12D. If dynamic locomotive braking is not being applied the main generator current and the main generator voltage are monitored as required by the computer to calculate the locomotive pulling force $F_{loco}$ in accordance with the following equation:

$$F_{loco} = \frac{((V_g I_g)E_g E_{TM} 375)}{745.7} - N_L R_L$$

wherein:
- $F_{loco}$ = locomotive pulling force, lbs.;
- $V_g$ = main generator voltage volts;
- $I_g$ = main generator current, amperes;
- $E_g$ = main generator efficiency (approximately 91%);
- $E_{TM}$ = traction motor efficiency (approximately 96%);
- $N_L$ = number of locomotives in consist; and
- $R_L$ = rolling resistance of each locomotive is calculated from a modified Davis train resistance formula (note equation (2) supra.)

As discussed in FIG. 12D, braking resistance $R_b$ due to locomotive independent air brakes may be optionally added to the net tractive effort to provide a corrected locomotive coupler force $F_{loco}$.

When locomotive pulling force has been calculated as described above acceleration coupling forces between bars throughout the train may be calculated in accordance with the equations as previously set forth in the Mathematical model section, note equation (4).

Once the acceleration factor $R_A$ is calculated the total force upon each coupler may be calculated $R_{RBAn}$, note equation (1) in the Mathematical Model section. The computer 500 then sends this information through display controller 534 to draw a coupler force distribution diagram 318, upon the CRT display 536, note FIG. 7.

As illustrated in FIG. 12G, a record keeping routine may be provided in the computer to provide a record of the operation of the train. In addition, train location and train speed may be periodically updated and, when the train has moved far enough to justify redrawing of the profile, a new block of profile data may be read by cycling the routine back to point A in FIG. 12A. If the train has not moved far enough to justify the redrawing of the profile, a new cycle may be initiated by cycling back to point B of FIG. 12B and onto one of the points C1, C2 or C3 of FIGS. 12C-12E, depending upon the technique utilized to determine locomotive pulling force.

In summary, the computer 500 operates in conjunction with the input/output devices as shown in FIGs. 9-11 and 12A-12G to dynamically provide a periodically updated display of the car coupler forces in the train over the length of the train. Depending upon the speed of the computer, the period between successive updates of the force distribution may be extremely rapid so as to appear to be a continuous or an analog update.

The coupler force distribution data is displayed against a background which includes a profile of the track as well as landmarks along the track. From the displayed information, the engineman can minimize excessive coupler forces in any one section of the train and more evenly distribute forces by controlling the throttle setting, etc.

The foregoing discussion in connection with FIGs. 12A–G provides a logic flow chart for dynamically calculating individual coupler forces throughout the extent of a train as the train proceeds along a predetermined route of travel and dynamically displaying the forces to the engineman. in a similar vein one skilled in the art will be able to appreciate that the foregoing may be supplemented to draw a hypothetical force profile 326 which would exist if the locomotive pulling force were altered to a value different from that actually measured or calculated. This concept may then be carried one step further to dynamically instruct an engineman, at 334 FIG. 7, of an optimum throttle setting, or if preferred, automatically set the throttle to most efficiently operate the train consistant with train action forces, speed limits, etc. Of course, if the latter mode is selected an engineman would always be provided with a manual override so that independent engineman judgment may be added to the control operation.

SCHEMATIC DISPLAY SEQUENCE

Turning now to FIGS. 13-29 of the drawings there will be seen abbreviated schematics of display screens 300 as previously discussed in connection with FIG. 7. These schematics will serve to functionally illustrate a dynamic sequence of train presence of a grade profile and car coupler force distributions according to a preferred embodiment of the invention.

Turning specifically now to FIG. 13 there will be seen a screen display portion 300 of a cathode ray tube mounted within the cab of the lead locomotive. Vertical mile post indicators 304 bear a sequential caption 296-299 representing physical mile posts along a predetermined route of travel of the train.

A transverse indulating trace 710 provides a visual track grade profile across the screen between the mile post indicators. The train is depicted by trace 712 and is superimposed upon the grade line 710.

From the trace 712 it will be appreciated that the train is approximately one mile long with the locomotive positioned midway between mile posts 296 and 297 while the caboose is approaching mile post 296. Accordingly the operative direction of travel of the rain is from left to right in ascending order of mile post indicators. Functionally the train trace 712 remains stationary while the grade line 710 and mile posts are moved from right to left.

Directly beneath the train trace 712 is a coupler force distribution trace 714 which is initialized with respect to the locomotive by a vertical trace 716. Horizontal trace 718 positioned beneath the coupler force 714 corresponds to a zero coupler force value.

The computed coupler force trace 714 of FIG. 13 indicates that the entire train is in tension, that is the coupler forces between each car is a positive value. In this connection the locomotive pulling force or the force level of the trace which intersects vertical reference line 716 at 720, for purposes of illustration, may represent 35,000 pounds. At the end of the locomotive the coupler force is necessarily zero which therefore rests on the ordinate 718 at point 722.

Between points 720 and 722 individual car coupling forces may be either positive or negative. At this particular track location all of the coupler forces are positive or the entire train is in tension and more particularly approximately the entire train in advance of mile post 296 is under a tension of approximately 35,000 pounds. Car coupling tension forces following mile post 296 linearly taper down to 0 at the tail end of the train.

Referring now to FIG. 14, which may be a time event approximately 30 seconds subsequent to the time event of FIG. 13, the mile posts and track profile have been redrawn and shifted to the left while the trace 712 remainded stationary to indicate conditions as the train physically proceeds along the track. In this connection the train is shown at a position just beyond mile post 297. From the grade trace it will be appreciated that the entire train is operating on a descending grade. The throttle setting in the locomotive has been reduced and the locomotive coupler pulling force has been reduced at 724 to approximately 20,000 pounds. The car coupler force profile 726 indicates that the entire train is still in tension although positive forces are decreasing in the middle of the train.

FIG. 15 discloses a sequential time event wherein the mile post 297 is positioned a short distance behind the locomotive. The locomotive coupler pulling force as at 728 has been kept at 20,000 pounds and a distinct dip in the car coupler force profile 730 approximately 15 to 20 cars back in the train indicates that a run-in train action event is about to develop.

Proceeding to FIG. 16 the mile posts and track profile have been redrawn and the train now stands advanced slightly further with the locomotive coupler pulling force at 732 still reading 20,000 pounds. The car coupler force profile 734 approximately in the middle of the train has gone slightly negative indicating that a run-in train action event is definitely going to develop unless action is taken. The slight run-in or negative forces indicated in the middle of the train at this point in time are probably not yet sufficient to overcome the preload of the draft gears associated with the car couplers although a run-in is imminent. At this point in time and superimposed beneath the actual calculated car coupler force profile 734 a further calculated car coupler force profile 736 is depicted and indicates that if the locomotive pulling force were increased at 738 to 30,000 pounds tension could have been maintained throughout the length of the train and thus the potential for a run-in action as indicated from the actual calculated profile 734 may be avoided.

In sequential time event depicted in FIG. 17 the mile posts and grade lines have been redrawn and the train 712 is advanced relative thereto toward mile post 298. The actual pulling force on the locomotive as at 740 has been kept constant at 20,000 pounds. The dip in the car coupler force profile 742 in the rear two-thirds of the train below the zero value trace 718 indicates compressive forces exist throughout the rear two-thirds of the train and a run-in is definitely developing as the train proceeds down the descending grade around mile post 297. Positioned beneath the actual trace 742 is a hypothetical car coupler force trace 746 which indicates that if the throttle position were increased so as to generate a locomotive coupler pulling force of approximately 55,000 pounds at 748 the run-in could have been prevented.

In sequential FIG. 18 the locomotive is beginning to encounter an ascending grade. If the pulling force by the locomotive were reduced as at 750 to 15,000 pounds, as an engineman may select from his feeling of increasing speed in going down a grade, the negative dip in the car coupler force profile 752 and the compressive run-in conditions are merely aggravated. As opposed to decreasing locomotive pulling force as the engineman may do from his sense of increased speed in going down a gentle grade the hypothetical profile beneath the actual car coupler profile indicates that if the throttle setting were advanced such that the locomotive coupler pulling force were increased to 60,000 pounds as at 754 the coupler force profile 756 could have been maintained positive throughout the extent of the train and thus the run-in event could still have been prevented.

Figure 19:
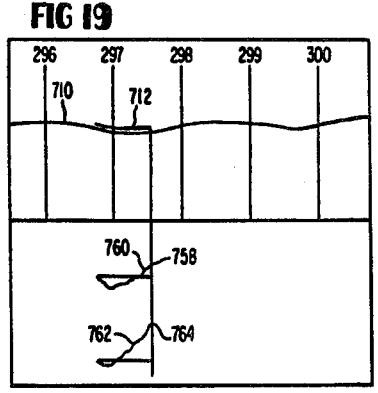

Looking now at sequential FIG. 19 the engineer has maintained the throttle to produce a locomotive coupler pulling force of 15,000 pounds as at 758. The run-in will continue to develop and the car coupler force profile 760 indicates the rear two-thirds of the train possesses compressive coupler forces thus indicating that the entire back of the train is now running in. The hypothetical force distribution 762 underlying the actual force distribution indiates that if the locomotive throttle setting were advanced to produce a pulling force of approximately 50,000 pounds as at 764 a run-in may still develop but would only involve about the back one-fourth of the train.

Figure 20:
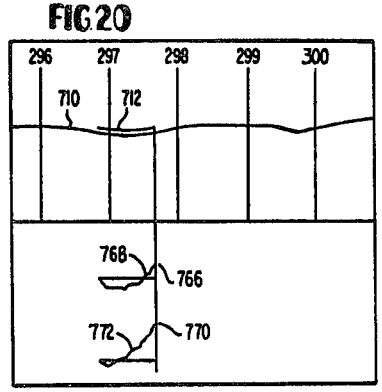

Proceeding to FIG. 20 the train is proceeding up a slight grade toward mile post 298. The locomotive pulling force is maintained at about 15,000 pounds as at 766. The resultant car coupler force distribution 768 indicates that run-in is still developing in the back two-thirds of the train. The hypothetical distribution below trace 768 indicates that if the locomotive throttle position were reestablished at a notch setting operable to produce about 50,000 pounds of coupler pulling force as at 770 a car coupler force trace 772 resulting therefrom still indicates that a run-in may develop but will only involve approximately the back one-fourth of the train.

Figure 21:
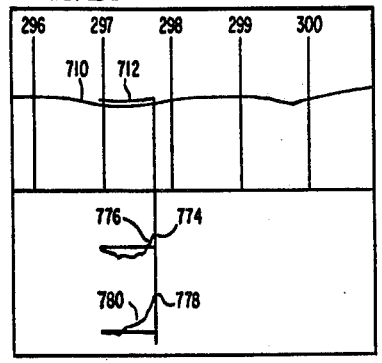

Sequential FIG. 21 indicates that the front of the train is ascending a grade approaching mile post 298. The pulling force has been increased to 20,000 pounds as at 774, however, as the car coupler force profile 776 indicates, the run-in is involving ears closer to the locomotive and approximately three-fourths of the train is almost completely run-in. If the locomotive engineer were to adjust the notch setting of the throttle to a position producing approximately 50,000 pounds of locomotive coupler force as at 778 a hypothetical car coupler force profile 780 could be produced wherein run-in would be essentially obviated.

Figure 22:
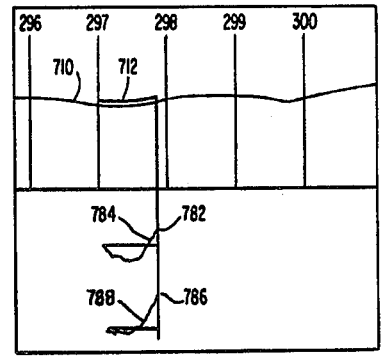

In sequential time event depicted in FIG. 22 the train has proceeded further up the ascending grade toward mile post 298. The locomotive throttle setting is such as to produce a pulling force of approximately 20,000 pounds as at 782, however, the car coupler force profile 784 indicates that the run-in is increasing in intensity in the rear three-quarters of the train. The intensity or severity of this run-in action could have been reduced by maintaining the throttle to provide in coupler force of approximately 50,000 pounds as at 736 which would generate a hypothetical car coupler force distribution 788.

Figure 23:
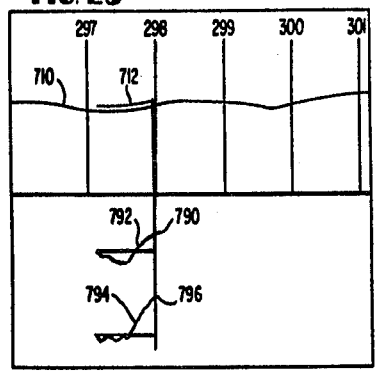

Referring now to FIG. 23 the train is approximately at mile post 298 and has been ascending a slight grade such that approximately the first half of the rain is ascending a grade. The throttle position has been increased to approximately 27,000 pounds as indicated at 790 and the car coupler force distribution 792 indicates that positive coupler values are proceeding from the front of the train to the rear. Thus this indicates that the front of the train is becoming tensioned and the zero crossover point from tension to compression is progressing toward the rear of the train. The train is now running out. The hypothetical coupler force trace 794 indicates that if the engineer had kept the throttle position set to approximately 50,000 pounds as at 796 the train end of the train would not yet be running out.

Figure 24:
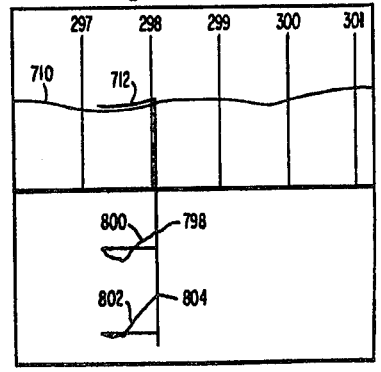

In FIG. 24 the train has just passed mile post 298 with the throttle position set so as to generate a locomotive pulling fore of 27,000 pounds as at 798. The car coupler force profile 800 indicates that the front half of the train is in tension and the rear half of the train is run-in or in compression. The hypothetical underlying force profile 802 indicates that if the engineer had maintained the throttle position such that a locomotive coupling pulling force of 50,000 pounds as at 804 were produced the point of transition from positive to negative forces would have remained stationary and the run-out would not have started.

Figure 25:
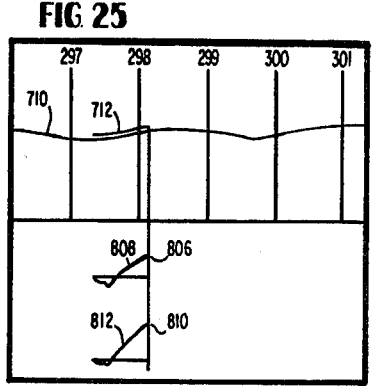

Turning now to FIG. 25 the train has advanced still further past mile post 298 toward mile post 299. The locomotive throttle has been increased so as to produce a locomotive coupling force of 33,000 pounds as at 806. This increase in pulling force is a typical operational characteristic for an engineer so as to maintain speed of the train upon an ascending grade. Tension or run-out in the front half of the train is evident from the car force profile 808 and is proceeding toward the rear of the train. If the engineer had repositioned the throttle to a setting operable to produce a pulling force of approximately 50,000 pounds as at 810 the car force profile 812 would indicate that although a run-out is occurring it has not yet reached the rear of the train.

Figure 26:
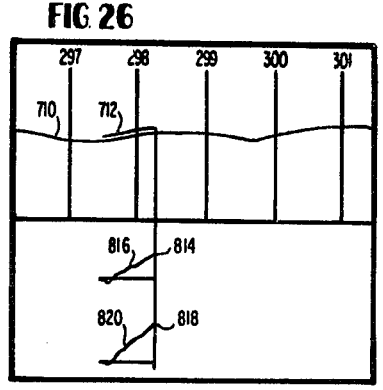

Advancing now to FIG. 26 the train is still proceeding toward mile post 299 on an ascending grade. The locomotive engineer has increased the throttle setting to generate a locomotive coupling or pulling force of approximately 40,000 pounds as indicated at 814. The resultant car coupler force profile 816 indicates that run-out is still developing and a very small number of cars are run-in at the tail end of the train. If the engineer had maintained the throttle setting to generate a pulling force of 50,000 pounds as indicted at 820 the run-out would be about the same as it would have been if the pulling force were 40,000 pounds as indicated at 816.

Figure 27:
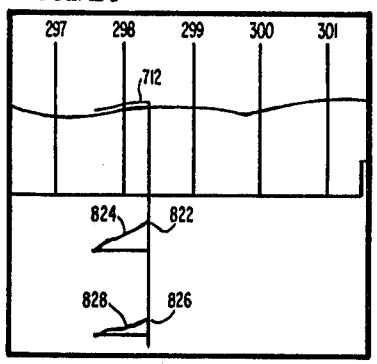

Turning now to FIG. 27 the train is still advancing toward mile post 299. The engineer has positioned the throttle such as to produce a locomotive coupling force of 40,000 pounds as at 822. The car coupling force profile 824 indicates that the entire train is in tension and coupling tension forces exist throughout the train. At this point in time the engineer could have reduced the throttle setting to generate a pulling force of approximately 20,000 pounds as at 826 and still have maintained tension throughout the train as indicated by car coupler profile 828.

Figure 28:
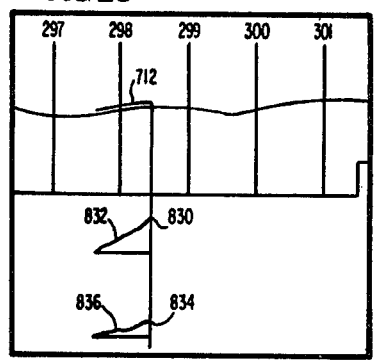

FIG. 28 depicts sequential time event wherein the train has advanced to a posture whrein the locomotive is approximately midway between mile posts 298 and 299. The engineer has further increased the throttle setting so as to produce a coupling force of approximately 50,000 pounds as at 830 thus maintaining tension or run-out profile 832 throughout the train. The engineer, however, could have reduced the throttle setting to a position generating a locomotive pulling force of only 20,000 pounds as indicated at 834 and still have maintained a stretched or tension mode of the entire train as indicated in hypothetical car coupler 836.

Figure 29:
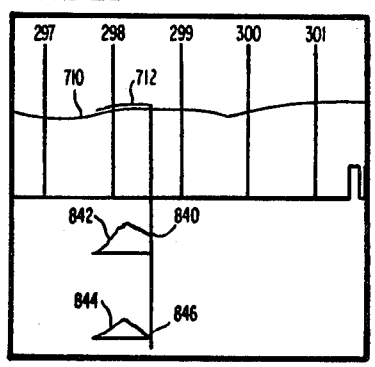

The final time sequence event depicted in FIG. 29 discloses the train in a position advanced still further toward mile post 299 wherein the locomotive is positioned at the apex of the track grade profile. The engineer has reduced the locomotive throttle setting so as to produce a locomotive pulling force of approximately 40,000 pounds as at 840. However, the car coupler force profile 842 indicates that tension forces of about 75,000 pounds are exhibited at a peak point approximately in a midspan portion of the train thus indicating that forces in the train can far exceed the net pulling force exerted by the locomotives. The hypothetical force profile 844 indicates that the engineer could have cut the throttle back to idle thus producing zero locomotive pulling force at 846 and still have maintained the entire train in tension.

The foregoing discussion of a rain operational sequence for approximately 2 miles over a typical track grade profile is not intended to be exhaustive but merely illustrative of run-in and run-out events that may occur and corrective action that may be taken by a locomotive engineer if presented with appropriate force distribution profiles as the train is proceeding along a predetermined route of travel.

SUMMARY OF MAJOR ADVANTAGES OF THE INVENTION

From the foregoing detailed description of preferred embodiments of the invention several unique and highly advantageous methods and apparatus for facilitating control of a train have been delineated.

More particularly a projection of the track and train profiles within the cab of the locomotive enables an engineman to more effectively and efficiently control a train.

Additionally dynamic train presence monitoring enables even an inexperienced engineman to efficiently operate long trains of widely varying consist over widely varying terrains. At the same time optimum speed performance may be obtained, accurately consistant with speed and safety limits, by the advantageous utilization of descending grades. Such accurate control, of course, ultimately enables fuel consumption to be minimized.

Further, by the provision of the subject system, locomotive coupling forces may be determined by one of three techniques and the remaining individual car coupling forces may be dynamically calculated to provide an engineman with car coupling force distributions without requiring an expensive and impractical physical measurement of coupling force at each coupler shank.

By the provision of a force profile display throughout the length of the train the engineman may take corrective action such as speeding up or slowing down the locomotive, applying or releasing the train brakes, locomotive independent air brakes, or locomotive dynamic brakes in order to obviate or minimize the occurrence of a train action event somewhere throughout the length of the train.

The cathode ray tube display screen provides a capability for displaying to the locomotive engineer helpful and necessary operational information and instructions so as to permit an inexperenced engineman to effectively operate an extremely long modern train in a manner far exceeding the capabilities of even the most skilled "seat-of-the pants"engineers.

Yet further a significant advantage is provided by an effective means to accurately record and store train operational parameters such as speeds, throttle settings, braking applications, etc. in conjunction with grade profile speed limits, town locations, etc.

The above specification for economy of presentation specifically discloses the invention with respect to a train comprised of a lead locomotive set only. The foregoing disclosure, however, will enable one skilled in the art to readily adapt the components and equations disclosed herein to trains including one or more mid-train locomotive units as desired.

While the invention has been described with reference to preferred embodiments it will be appreciated by those skilled in the art that additions, deletions, modifications and substitutions or other changes not specifically described may be made which will fall within the purview of the appended claims.

What is claimed is:

1. A method for facilitating control of a railway train having at least one locomotive in a locomotive set and a plurality of cars successively linked thereto proceeding on a track over a predetermined route of travel, wherein each car of said plurality of cars has a coupler transmitting a coupling force between said car and that portion of the train which precedes said car over the predetermined route of travel, comprising:

the step of
  providing said train with a means for processing data including a memory for storing data, and a control system for transferring data received by said data processing means into said memory and for combining said data in said memory in accordance with a predetermined sequence of operations including performing predetermined calculations for determining a representation of said coupling force for each car;

the step of
  locating the position of each car in said train on said track over the predetermined route of travel and storing said positions in said memory;

the step of
  storing in said memory the coupling force representation of each car in said train calculated by said control system responsive to said located position of each car; and the step of
  displaying to the operator of said locomotive set, as the train proceeds along said predetermined route of travel, the coupling force representation stored for each car.

2. The method of claim 1 further comprising:

the step of
  storing on a data input medium a representation of the profile of the track along said predetermined route of travel;

the step of
  storing in said memory a representation of the length of all cars in said train; and wherein said step of locating the position of each car comprises transferring said profile representation stored on said data input medium into said memory responsive to the movement of said train over said predetermined route of travel such that the portion of said stored profile which represents the track over which said train is passing is stored in said memory concurrently with the passing of said train, and storing in said memory the position of each car on that portion of said profile representation which represents the track over which said train is concurrently passing, said position of each car obtained by said control system responsive to said stored length representation for each car and said profile representation as stored in said memory.

3. The method of claim 2 further comprising the steps of:

measuring the velocity of said train at the beginning of the period of said locating step and transferring said velocity measurement into said memory;

storing in said memory a representation of the consist of all cars in said train; and wherein said step of storing the coupling force representation of each car in said memory comprises a first series of successive substeps wherein each substep comprises storing a component of said coupling force of one car of said cars representative of the rolling resistance of that portion of the train which follows said coupler of said one car, said rolling resistance component calculated by said control system responsive to said stored velocity measurement and said consist representation.

4. The method of claim 3 wherein:

said consist representation in said memory for the $n$th car from the rear of said train comprises:

average weight per axle in tons ($W_n$), total number of axles ($N_n$), coefficient of rolling resistance typically 0.030 to 0.045 ($C_{Vn}$), cross-sectional area in square feet of the front of said nth car ($A_n$), and coefficient of wind resistance typically 0.0003 to 0.003 ($C_{Dn}$); the first substep of said first series of successive substeps stores the coupling force representation of the last car in the train calculated by said control system, and said first series of substeps progresses from the coupling force representation of said last car to the coupling force representation of the first car in said train; and the substep of said first series of successive substeps for the $n$th car from the rear of said train wherein a component of said coupling force representative of the rolling resistance of that portion of the train which follows said coupler of said $n$th car is stored comprises:

storing in said memory a component of said coupling force representative of the rolling resistance in pounds of the $n$th car ($R_{Rn}$) calculated by said control system by the equation $R_{Rn} = (1.3+(29/W_n)+C_{Vn}V+(C_{Dn}A_nV^2/W_nN_n))W_nN_n$ where V is the measured velocity of said train in miles per hour; and adding said rolling resistance component of said $n$th car ($R_{Rn}$) to the sum of the rolling resistance component of all cars of said train which follows said $n$th car as stored by the preceding substeps of said first series of successive substeps.

5. The method of claim 3 wherein said profile of the track in said memory includes a representation of the grade of the track along that portion of said predetermined route of travel; and wherein each substep in said first series of successive substeps additionally comprises storing a component of said coupling force of one car of said cars representative of the rolling resistance due to the grade of the track under that portion of the train which follows said coupler of said one car, said grade component calculated by said control system responsive to said grade representation and said consist representation.

6. The method of claim 5 wherein:

said consist representation in said memory for the $n$th car from the rear of said train additionally comprises average weight per axle in tons ($W_n$), and total number of axles ($N_n$);

the first substep of said first series of successive substeps stores the coupling force representation of the last car in the train calculated by said control system, and said first series of substeps progresses from the coupling force representation of said last car to the coupling force representation of the first car in said train; and the substep of said first series of successive substeps for said $n$th car from the rear of said train wherein a component of said coupling force representative of the rolling resistance due to the grade of the track under that portion of the train which follows said coupler of said $n$th car is stored comprises:

storing in said memory a component of said coupling force representative of the rolling resistance of the $n$th car due to the grade of the track under the $n$th car (grade value $_n$), calculated by the control system by the equation grade value $_n = 20\, G_n\, W_n\, N_n$ where $G_n$ is the slope of said grade in percent; and adding said rolling resistance component due to the grade of said $n$th car (grade value $_n$) to the sum of the rolling resistance component due to the grade of all cars of said train which follows said $n$th car as stored by the preceding substeps of said first series of successive substeps.

7. The method of claim 5 wherein said profile of said track in said memory includes a representation of the curvature of the track along that portion of said predetermined route of travel; and wherein each substep in said first series of successive substeps additionally comprises storing a component of said coupling force of one car of said cars representative of the rolling resistance due to the curvature of the track under that portion of the train which follows said coupler of said one car, said curvature component calculated by said control system responsive to said curvature representation and said consist representation.

8. The method of claim 7 wherein:

said consist representation in said memory for the $n$th car from the rear of said train additionally comprises average weight per axle in tons ($W_n$), and total number of axles ($N_n$);

the first substep of said first series of successive substeps stores the coupling force representation of the last car in the train calculated by said control system, and said first series of substeps progresses from the coupling force representation of said last car to the coupling force representation of the first car in said train; and the substep of said first series of successive substeps for said $n$th car from the rear of said train wherein a component of said coupling force representative of the rolling resistance due to the curvature of the track under that portion of the train which follows said coupler of said $n$th car is stored comprises:

storing in said memory a component of said coupling force representative of the rolling resistance of the $n$th car due to the curvature of the track under the $n$th car (track curvature value $_n$) calculated by said control system by the equation track curvature value $_n = 0.8\ C_n W_n N_n$ where $C_n$ is the curvature in degrees; and adding said rolling resistance component due to the curvature of said $n$th car (track curvature value $_n$) to the sum of the rolling resistance component due to the curvature of all cars of said train which follows said $n$th car as stored by the preceding substeps of said first series of successive substeps.

9. The method of claim 3 further comprising:

the step of measuring a signal related to the pulling force of said locomotive set and transferring said signal measurement into said memory;

the step of storing in said memory a representation of the acceleration resistance force acting through said coupler of each car due to that portion of the train which follows each car, said acceleration resistance force representation calculated by said control system responsive to said measured signal, said consist representation of each car, and said coupling force of said car stored in said first series of successive substeps; and the step of adding said acceleration resistance force representation calculated for each car to the coupling force representation stored for each car to obtain a new coupling force representation for each car prior to said displaying step.

10. The method of claim 9 further comprising the additional step of storing in said memory a representation of the pulling force of said locomotive set ($F_{loco}$) calculated by said control system responsive to said measured signal; and wherein:

said consist representation in said memory for the $n$th car from the rear of said train comprises average weight per axle in tons($W_n$), and total number of axles ($N_n$);

said step of storing the acceleration resistance force representation of each car in said memory comprises a second series of successive substeps wherein the first substep of said second series of successive substeps stores the acceleration resistance force representation of the last car in the train calculated by said control system, and said second series of substeps progresses from the acceleration resistance force representation of said last car to the acceleration resistance force representation of the first car in said train; and the substep of said second series of successive substeps for said $n$th car from the rear of said train comprises:

storing in said memory a component of said acceleration resistance force representative of the acceleration resistance of the $n$th car ($R_{An}$) calculated by said control system by the equation $R_{An} = ((F_{loco} - R_R)\ M_{en})/(M_{et})$ where $F_{loco}$ is said locomotive set pulling force, $R_R$ is the coupling force in pounds representation of said first car as stored in said memory in said first series of successive substeps, $M_{en}$ is the effective mass of said $n$th car calculated by the equation $M_{en} = 91.05\ W_n N_n + 36.36\ N_n$, and $M_{et}$ is the effective mass of the total cars equal to the sum of the effective mass of all cars in said train; and adding said acceleration resistance force component of said $n$th car ($R_{An}$) to the sum of the acceleration resistance force component of all cars of said train which follows said $n$th car as stored by the preceding substeps of said second series of successive substeps.

11. The method of claim 10 wherein the measuring signal step comprises measuring a signal from a dynamometer located between said locomotive set and the first car of said train, and said locomotive set pulling force representation is said signal from said dynamometer.

12. The method of claim 10 further comprising the step of storing in said memory a representation of the consist of said locomotive set; and said locomotive set pulling force representation is calculated by said control system responsive to said measured signal and said locomotive consist representation.

13. The method of claim 12 further comprising:

the step of measuring air pressure of an independent air brake in said locomotive set and transferring said measured locomotive air brake pressure measurement into said memory;

the step of storing in said memory a locomotive independent air brake resistance calculated by said control system responsive to said stored locomotive air brake pressure measurement; and the step of subtracting said locomotive independent air brake resistance from said locomotive set pulling force representation to obtain a new locomotive set pulling force representation prior to performing said second series of successive substeps.

14. The method of claim 12 wherein:

said measuring signal step comprises measuring the current (I) of a traction motor of said locomotive set;

said locomotive set consist representation comprises a constant coefficient for said traction motor (K), traction motor gear ratio (R), number of operative traction motors ($N_{TM}$), number of locomotive units in said locomotive set ($N_L$) running resistance of each locomotive ($R_L$), motor current corresponding to zero motor torque ($I_S$), and wheel diameter (D); and said locomotive set pulling force representation ($F_{loco}$) stored in said memory is calculated by said control system by the equation $F_{loco} = ((K\ R\ N_{TM} N_L (I - I_S))/D) - N_L R_L.$ 15. The method of claim 12 wherein:

said measuring signal step comprises measuring a main generator voltage ($V_g$) of the lead locomotive of said locomotive set;

said method further comprising measuring a main generator current ($I_g$) of the lead locomotive of said locomotive set; and wherein:

said locomotive set consist comprises
main generator efficiency ($E_g$),
traction motor efficiency ($E_{TM}$), and
number of locomotives in said locomotive set ($N_L$); and said locomotive set pulling force representation ($F_{loco}$) stored in said memory is calculated by said control system by the equation $$F_{loco} = ((375\, V_g I_g E_g E_{TM})/745.7) - N_L R_L$$

where $R_L$ is the rolling resistance of each locomotive calculated by said control system from a modified Davis train resistance formula.

16. The method of claim 2 further comprising the step of measuring the brake pipe pressure of a trainline in said train and transferring said trainline brake pipe pressure measurement into said memory; and wherein each substep in said first series of successive substeps additionally comprises storing a component of said coupling force of one car of said cars representative of the car braking resistance forces of that portion of the train which follows said coupler of said one car, said car braking resistance component calculated by said control system responsive to said stored trainline brake pipe pressure measurement and said consist representation.

17. The method of claim 2 wherein said displaying step comprises the steps of:

providing said locomotive set with an electronic display screen under the supervision of said control system;

projecting onto said screen a trace of that portion of said profile representation in said memory which represents the track over which said train is concurrently passing;

projecting onto said screen, parallel with said profile trace, a train trace indicating the position of each car of said train; and projecting onto said screen, correlated with said train trace, a car coupling force level trace indicating the force level of the coupling force representation of each car;

18. The method of claim 1 wherein said displaying step comprises displaying on a screen under the supervision of said control system the coupling force representation of each car in said train as stored in the memory of said data processing means.

19. A method for facilitating control of a railway train having at least one manually operated locomotive in a locomotive set and a plurality of cars, each car of the plurality of cars having a coupler transmitting a coupling force between it and that portion of the train which precedes it in the train, comprising the steps of:

a. providing data related to track profile, train consist, locomotive tractive effort, train braking and the location of the train on the track;

b. calculating from the provided data the coupling forces between each of a plurality of adjacent cars in the train; and, c. displaying to the operator of the locomotive each of a plurality of the calculated coupling forces relative to the position in the train of the cars for which the calculations were made whereby control of the railway train is facilitated.

20. The method of claim 19 including the further step of electronically displaying to the operator of the locomotive a predetermined portion of the track profile and a representation of the train relative to the displayed profile.

21. The method of claim 20 wherein the data related to the location of the train on the track is provided by measuring the velocity of the train along the track.

22. The method of claim 21 wherein the data related to locomotive tractive effort is provided by measuring coupler force between the locomotive set and the adjacent car in the plurality of cars.

23. The method of claim 21 wherein the locomotive set is electrically driven by traction motors and the data related to locomotive tractive effort is provided by measuring traction motor current of the locomotive set and calculating locomotive tractive effort in response to the measured value of traction motor current.

24. The method of claim 21 wherein the locomotive set is electrically driven by power supplied from a main generator and wherein the data related to locomotive tractive effort is provided by monitoring the power supplied from the main generator and calculating locomotive tractive effort in response to the monitored power.

25. The method of claim 20 wherein the calculated coupling forces are displayed by electronically displaying values of the calculated coupling forces relative to a zero force ordinate and relative to the displayed representation of the train.

26. The method of claim 19 wherein the data related to the locomotive tractive effort is provided by measuring coupler force between the locomotive set and the adjacent car in the plurality of cars.

27. The method of claim 26 wherein the data related to the location of the train on the track is provided by measuring the velocity of the train along the track.

28. The method of claim 19 wherein the locomotive set is electrically driven by traction motors and the data related to locomotive tractive effort is provided by measuring traction motor current of the locomotive set and calculating locomotive tractive effort in response to the measured value of traction motor current.

29. The method of claim 28 wherein the data related to the location of the train on the track is provided by measuring the velocity of the train along the track.

30. The method of claim 19 wherein the locomotive set is electrically driven by power supplied from a main generator and wherein the data related to locomotive tractive effort is provided by monitoring the power supplied from the main generator and calculating locomotive tractive effort in response to the monitored power.

31. A method for facilitating control of a railway train having at least one manually operated locomotive in a locomotive set and a plurality of cars, each car of the plurality of cars having a coupler transmitting a coupling force between it and that portion of the train which precedes it in the train, comprising the steps of:

a. providing data related to track profile, train consist, locomotive tractive effort, train braking and the location of the train on the track;

b. calculating from the provided data the coupling forces between each of a plurality of adjacent cars in the train; and, c. displaying to the operator of the locomotive, in response to the calculated coupling forces, instructions regarding the operation of the train whereby control of the train is facilitated.

32. The method of claim 31 wherein the train includes a plurality of locomotive sets, the instructions including instructions regarding the operation of each of the plurality of locomotive sets.

33. The method of claim 31 including the further step of electronically displaying to the operator of the locomotive a predetermined portion of the track profile and a representation of the train relative to the displayed profile.

34. The method of claim 33 wherein the calculated coupling forces are displayed by electronically displaying values of the calculated coupling forces relative to a zero force ordinate and relative to the displayed representation of the train.

35. A method for dynamically calculating the coupler forces in a railway train proceeding on a track over a predetermined route of travel, the train including at least one locomotive set and a plurality of cars each having a coupler transmitting a coupling force between it and that portion of the train which precedes it in the train, comprising the steps of:

a. providing data related to track profile, train consist, and the initial location of the train on the track;

b. dynamically determining the tractive effort of the locomotive;

c. dynamically determining changes in the position of the train on the track; and, d. dynamically calculating, in response to the provided data, the determined locomotive tractive effort and the determined changes in train position, the coupling forces between each of a plurality of adjacent cars in the train.

36. A method of dynamically displaying the coupler forces of a railway train proceeding on a track over a predetermined route of travel, including at least one manually operated locomotive set and a plurality of cars each having a coupler transmitting a coupling force between it and that portion of the train which precedes it in the train, comprising the steps of:

a. dynamically determining the coupling forces between each of a plurality of adjacent cars in the train; and, b. dynamically displaying to the operator of the locomotive set each of the determined coupling forces relative to the location in the train for which the coupling forces forces are being determined.

37. A method of controlling a railway train having at least one locomotive in a locomotive set and a plurality of cars, each car of the plurality of cars having a coupler transmitting a coupling force between it and that portion of the train which precedes it in the train, comprising the steps of:

a. providing data related to track profile, train consist, locomotive tractive effort, train braking and the location of the train on the track;

b. calculating from the provided data the coupling forces between each of a plurality of adjacent cars in the train; and, c. controlling the operation of at least one locomotive responsively to the calculated coupling forces.

38. An apparatus for facilitating control of a railway train having at least one locomotive in a locomotive set and a plurality of cars successively linked thereto proceeding on a track over a predetermined route of travel, wherein each car of said plurality of cars has a coupler transmitting a coupling force between said car and that portion of the train which precedes said car over the predetermined route of travel, comprising:

data processing means located in said train for processing data including a memory for storing data, and a control system for transferring data received by said data processing means into said memory and for combining said data in said memory in accordance with a predetermined sequence of operations including performing predetermined calculations for determining a representation of said coupling force for each car;

data supplying means responsive to movement of said train on said track over the predetermined route of travel for supplying data representative of the profile of said track to said data processing means enabling said control system to transfer into said memory data representative of the profile of that portion of the track over which said train is passing;

coupling force data storage means in said memory of said data processing means for storing a coupling force representation calculated by said control system for each car in said plurality of cars responsive to the location of said each car, at the beginning of said period, on that portion of the track represented by said profile data in said memory; and display means under the supervision of said control system for displaying to the operator of said locomotive set, as the train proceeds along said predetermined route of travel, the coupling force representation of each car in said train stored in said coupling force data storage means.

39. The apparatus of claim 38 wherein said data supplying means comprises:

a data input medium in said train for storing said track profile representative of the track over said predetermined route, and train locating means connected to said data processing means for locating the position of said train on the track over said predetermined route enabling said control system to transfer into said memory responsive to said located train position, the stored profile data representative of that portion of the track over which said train is passing.

40. The apparatus of claim 39 wherein said train locating means comprises:

sensing means connected to a wheel of said train for measuring the distance traveled by said train over said predetermined route;

transmitting means connecting said sensing means to said data processing means and under the supervision of said control system for transmitting said measured distance traveled from said sensing means to said data processing means; and said data processing means further comprises distance data storage means in said memory for storing said sensed distance traveled measured by said sensing means and transferred into said distance data storage means by said control system, train position data storage means in said memory for storing the position of said train on said predetermined route of travel having been calculated by said control system responsive to said stored distance traveled measurement, and for utilization by said control system in the transfer of data from said data input medium into said memory responsive to said calculated position of said train, car length data storage means in said memory containing a representation of the length of each car in said train, and car position data storage means in said memory for storing the location of said each car on that portion of the track represented by said profile data in said memory as calculated by said control system responsive to said stored profile data, said train position and said car length representation.

41. The apparatus of claim 40 wherein said data processing means further comprises:

car consist data storage means for storing a representation of the car consist of each car for utilization by said control system in calculating a component of said coupling force for each car representative of the rolling resistance of all the cars in said train which follows said coupler of said each car.

42. The apparatus of claim 41 wherein:

said sensing means further includes means for measuring the velocity of said train;

said data processing means further comprises;

velocity data storage means in said memory for storing said measured train velocity as transferred from said sensing means into said velocity data storage means by said control system, and said car consist data storage means includes storage means for storing car consist data for the nth car from the rear of said train including average weight per axle in tons ($W_n$), total number of axles ($N_n$), coefficient of rolling resistance typically 0.030 to 0.045 ($C_{vn}$), cross-sectional area of the front of said nth car in square feet ($A_n$), and coefficient of wind resistance typically 0.0003 to 0.003 ($C_{Dn}$); and said coupling force data storage means includes a representation of the coupling force of said nth car having a component representative of the rolling resistance in pounds of said nth car ($R_{Rn}$) calculated by said control system by the equation $$R_{Rn} = (1.3 + (29/W_n) + C_{vn}V + (C_{Dn}A_n V^2/W_n N_n)) W_n N_n$$

where V is the measured velocity of said train stored in said velocity data storage means.

43. The apparatus of claim 41 wherein said data processing means further comprises:

grade data storage means for storing a representation of the grade of that portion of the track represented by said storage profile data, and for utilization by said control system in calculating a component of said coupling force for each car representative of the rolling resistance due to the grade of the track under all cars in said train which follows said coupler of said each car.

44. The apparatus of claim 43 wherein said car consist data storage means includes storage means for storing car consist data for the nth car from the rear of said train including average weight per axle in tons ($W_n$), and total number of axles ($N_n$); and said coupling force data storage means includes a representation of the coupling force of said nth car having a component representative of the rolling resistance of said nth car due to the grade of the track under the nth car (grade value $_n$) by the equation grade value $_n = 20\, G_n\, W_n\, N_n$ where $G_n$ is the slope of said grade in percent.

45. The apparatus of claim 82 wherein said data processing means further comprises:

curvature data storage means for storing a representation of the curvature of that portion of the track represented by said stored profile data, and for utilization by said control system in calculating a component of said coupling force for each car representative of the rolling resistance due to the curvature of the track under all cars in said train which follows said coupler of said each car.

46. The apparatus of claim 45 wherein said car consist data storage means includes storage means for storing car consist data for the nth car from the rear of said train including average weight per axle in tons ($W_n$), and total number of axles ($N_n$); and said coupling force data storage means includes a representation of the coupling force of said nth car having a component representative of the rolling resistance of said nth car due to the curvature of the track under the nth car (track curvature value$_n$) by the equation track curvature value $_n = 0.8\, C_n\, W_n\, N_n$ where $C_n$ is the curvature in degrees.

47. The apparatus of claim 41 used in conjunction with said train having a trainline brake pipe for controlling, responsive to pressure in said trainline brake pipe, brakes located in each car of said train wherein said apparatus further comprises:

pressure sensing means for sensing the pressure in said trainline brake pipe;

transmitting means connecting said pressure sensing means to said data processing means and under the supervision of said control system for transmitting said sensed trainline brake pipe pressure to said data processing means; and said data processing means further comprises trainline brake pipe pressure data storage means in said memory for storing said measured trainline brake pipe pressure as transferred by said control system into said trainline brake pipe pressure data storage means, and for utilization by said control system in conjunction with said stored representation of the car consist of each car to the calculation of a component of said coupling force of each car representative of the car braking resistance forces of that portion of the train which follows said coupler of said each car.

48. The apparatus of claim 41 further comprising:

sensing means connected to said locomotive set for sensing a measurement related to the pulling force of said locomotive set;

transmitting means connecting said sensing means to said data processing means and under the supervision of said control system for transmitting said pulling force related measurement to said data processing means; and wherein said data processing means includes locomotive set pulling force data storage means in said memory for storing a locomotive set pulling force calculated by said control system responsive to said locomotive set pulling force related measurement, and acceleration resistance force data storage means for storing a representation of the acceleration resistance force acting through the coupler of each car and representative of that portion of the train which follows said coupler of said each car as calculated by said control system responsive to said stored locomotive set pulling force related measurement and said stored representation of the car consist of each car.

49. The apparatus of claim 48 wherein:

said force sensing means comprises a dynamometer between said locomotive set and first car following said locomotive set; and said data processing means further comprises;

storage means in said car consist data storage means for storing car consist data for the nth car from the rear of said train including average weight per axle in tons ($W_n$) and total number of axles ($N_n$), and said acceleration resistance force data storage means includes a representation of the acceleration force of said nth car having a component representative of the acceleration of said nth car ($R_{An}$) calculated by said control system by the equation $$R_{An} = ((F_{loco} - R_R) M_{en})/M_{et}$$

where $F_{loco}$ is said locomotive set pulling force stored in said locomotive set pulling force data storage means, $R_R$ is the coupling force in pounds of said first car as stored in said coupling force data storage means, $M_{en}$ is the effective mass of said nth car calculated by said control system by the equation $M_{en} = 91.05 \, W_n N_n = 36.36 \, N_n$, and $M_{et}$ is the effective mass of the total cars equal to the sum of the effective mass of all cars in said train.

50. The apparatus of claim 48 wherein said data processing means further comprises locomotive set consist data storage means in said memory for storing a representation of said locomotive set consist, and wherein said locomotive set pulling force data storage means contains a locomotive set pulling force calculated by said control system responsive to said locomotive set pulling force related measurement and said stored representation of said locomotive set consist.

51. The apparatus of claim 50 used in conjunction with said locomotive set having independent air brakes operated in response to an air pressure in said locomotive set wherein said apparatus further comprises:

pressure sensing means for measuring said independent air brake operating pressure;

transmitting means connecting said pressure sensing means to said data processing means and under the supervision of said control system for transmitting said measured independent air brake operating pressure to said data processing means; and said data processing means further comprises independent air brake operating pressure data storage means in said memory for storing said measurement of said independent air brake operating pressure means as transferred by said control system into said independent air brake operating pressure data storage means, and for utilization by said control system in conjunction with said stored representation of said locomotive set consist for calculating a component of said locomotive set pulling force representative of the braking resistance forces of said independent brakes of said locomotive set.

52. The apparatus of claim 50 used in conjunction with said train having a plurality of traction motors in said locomotive set wherein:

said sensing means measures the current (I) of one of said traction motors in said locomotive set; and said data processing means further comprises traction motor current data storage means in said memory for storing said current measurement of said one traction motor as transferred into said traction motor current data storage means by said control system; and said locomotive set consist data storage means containing a representation of a constant coefficient for said one traction motor (K), traction motor gear ratio (R), number of operative traction motors ($N_{TM}$), number of locomotive units in said locomotive set ($N_L$), running resistance of each locomotive ($R_L$), motor current corresponding to zero motor torque ($I_S$), and wheel diameter (D), for use by said control system in calculating said locomotive set pulling force ($F_{loco}$) by the equation $$F_{loco} = (K \, R \, N_{TM} N_L (I - I_S)/D) - N_L R_L.$$

53. The apparatus of claim 50 used in conjunction with said train having a main generator in a lead locomotive in said locomotive set, wherein:

said sensing means measures said main generator voltage ($V_g$) of said lead locomotive;

said apparatus further comprises second sensing means connected to said locomotive set for measuring said main generator current ($I_g$) of said lead locomotive, and transmitting means connecting said second sensing means to said data processing means and under the control of said control system for transmitting said generator current measurement to said data processing means; and said data processing means further comprises main generator voltage data storage means in said memory for storing said generator voltage measurement as transferred into said main generator voltage data storage means by said control system;

main generator current data storage means in said memory for storing said generator current as transferred into said main generator current data storage means by said control system; and said locomotive set consist data storage means containing a representation of main generator effeciency ($E_g$), traction motor efficiency ($E_{TM}$), and number of locomotives in said locomotive set ($N_L$)

for use by said control system in calculating said locomotive set pulling force ($F_{loco}$) by the equation $$F_{loco} = ((375 \, V_g I_g E_g E_{TM})/745.7) - N_L R_L$$

where $R_L$ is the rolling resistance of each locomotive calculated by said control system from a modified Davis train resistance formula.

54. The apparatus of claim 38 wherein said display means comprises an electronic display screen for displaying a visual presentation of:

a representation of that portion of the profile stored in said memory which represents the track over which said train is passing, a representation of the position of each car in said train on said profile as stored in said car position data register means, and a representation of the magnitude of the coupling force acting through the coupler of each car in said train as stored in said coupling force data register means.

55. Apparatus for facilitating control of a railway train having at least one manually operated locomotive in a locomotive set and a plurality of cars, each car of the plurality of cars having a coupler transmitting a coupling force between it and that portion of the train which precedes it in the train, the apparatus comprising:

means for storing data related to track profile, train consist, locomotive tractive effort, train braking and the location of the train on the track;

means responsive to the storing means for calculating from the stored data the coupling forces between each of a plurality of adjacent cars in the train; and, means responsive to the calculating means and the storing means for displaying to the operator of the locomotive each of a plurality of the calculated coupling forces relative to the position in the train of the cars for which the calculations were made whereby control of the railway train is facilitated.

56. The apparatus of claim 55 including means for electronically displaying to the operator of the locomotive a predetermined portion of the track profile and a representation of the train relative to the displayed profile in response to the stored data from said storing means.

57. The apparatus of claim 56 including means for measuring the velocity of the train along the track and for periodically updating the data related to the location of the train on the track in response to the measured velocity.

58. The apparatus of claim 57 including means for measuring coupler force between the locomotive set and the adjacent car in the plurality of cars and for periodically updating the stored data related to locomotive tractive effort in response to the measured coupler force.

59. The apparatus of claim 57 wherein the locomotive set is electrically driven by traction motors and including means for measuring traction motor current of the locomotive set and calculating locomotive tractive effort in response to the measured value of traction motor current, and means for periodically supplying the calculated locomotive tractive effort to the storing means.

60. The apparatus of claim 57 wherein the locomotive set is electrically driven by power supplied from a main generator and wherein the data related to locomotive tractive effort is provided by monitoring the power supplied from the main generator and calculating locomotive tractive effort in response to the monitored power, and means for periodically supplying the calculated locomotive tractive effort to the storing means.

61. The apparatus of claim 56 wherein the displaying means comprises means for electronically displaying values of the calculated coupling forces relative to a zero force ordinate and relative to the displayed representation of the train.

62. The apparatus of claim 55 including means for measuring coupler force between the locomotive set and the adjacent car in the plurality of cars and for periodically updating the stored data related to locomotive tractive effort in response to the measured coupler force.

63. The apparatus of claim 62 including means for measuring the velocity of the train along the track and for periodically updating the data related to the location of the train on the track in response to the measured velocity.

64. The apparatus of claim 55 wherein the locomotive set is electrically driven by traction motors and including means for measuring traction motor current of the locomotive set and calculating locomotive tractive effort in response to the measured value of traction motor current, and means for periodically supplying the calculated locomotive tractive effort to the storing means.

65. The apparatus of claim 64 including means for measuring the velocity of the train along the track and for periodically updating the data related to the location of the train on the track in response to the measured velocity.

66. The apparatus of claim 55 wherein the locomotive set is electrically driven by traction motors and including means for measuring traction motor current of the locomotive set and calculating locomotive tractive effort in response to the measured value of traction motor current, and means for periodically supplying the calculated locomotive tractive effort to the storing means.

67. Apparatus for facilitating control of a railway train having at least one manually operated locomotive in a locomotive set and a plurality of cars, each car of the plurality of cars having a coupler transmitting a coupling force between it and that portion of the train which precedes it in the train, the apparatus comprising:

means for providing data related to track profile, train consist, locomotive tractive effort, train braking and the location of the train on the track;

means for calculating, in response to the provided data, the coupling forces between each of a plurality of adjacent cars in the train; and, means for displaying to the operator of the locomotive, in response to the calculated coupling forces, instructions regarding the operation of the train whereby control of the train is facilitated.

68. The apparatus of claim 67 wherein the train includes a plurality of locomotive sets, the displaying means including means for displaying instructions regarding the operation of each of the plurality of locomotive sets.

69. The apparatus of claim 67 wherein the displaying means includes electronically displaying to the operator of the locomotive a predetermined portion of the track profile and a representation of the train relative to the displayed profile.

70. The apparatus of claim 69 wherein the displaying means includes means for electronically displaying values of the calculated coupling forces relative to a zero force ordinate and relative to the displayed representation of the train.

71. Apparatus for dynamically calculating the coupler forces in a railway train proceeding on a track over a predetermined route of travel, the train including at least one locomotive set and a plurality of cars each having a coupler transmitting a coupling force between it and that portion of the train which precedes it in the train, the apparatus comprising:

means for providing data related to track profile, train consist, and the initial location of the train on the track;

means for dynamically determining the tractive effort of the locomotive;
means for dynamically determining the velocity of the train and for determining changes in the position of the train on the track relative to the initial position in response to the determined velocity; and,
means for dynamically calculating, in response to the provided data, the determined locomotive tractive effort and the determined changes in train position, the coupling forces between each of a plurality of adjacent cars in the train.

72. Apparatus for dynamically displaying the coupler forces of a railway train proceeding on a track over a predetermined route of travel, including at least one manually operated locomotive set and a plurality of cars each having a coupler transmitting a coupling force between it and that portion of the train which precedes it in the train, the apparatus comprising:
means for dynamically determing the coupling forces between each of a plurality of adjacent cars in the train; and,
means for dynamically displaying to the operator of the locomotive set each of the determined coupling forces relative to the location in the train for which the coupling forces are being determined.

73. An apparatus for displaying railway train coupler forces comprising:
means for providing data related to track profile for a predetermined section of track and data related to train consist;
means for generating a first signal representative of a speed of a train represented by said train consist data;
means for providing a second signal, responsive to said first signal, said second signal being representative of a location of said train with respect to said provided section of track profile data;
means for generating a third signal related to a setting of a manually adjustable throttle, said third signal being representative of the locomotive tractive effort of an engine of said train;
means for generating a fourth signal related to a setting of a manually adjustable brake controller, said fourth signal being representative of the braking force of the train brakes of said train;
means for calculating train coupler forces responsive to said track profile data, train consist data, train speed signal, train location signal, locomotive tractive effort signal, and train braking signal; and
means for displaying in real time the calculated train coupler forces as individual force magnitudes relative to the train consist of the represented train.

74. The apparatus of claim 73 further comprising:
means for generating a fifth signal related to a setting of a manually adjustable locomotive brake controller, said fifth signal being representative of the braking force of the locomotive independent brakes of said train; and
means, included in said calculating means, for calculating said train coupler forces additionally responsive to said locomotive independent braking signal.

75. The apparatus of claim 73 further comprising means for displaying a portion of the track profile relative to the displayed coupler forces, wherein said track profile is displayed responsive to said train location signal.

76. The apparatus of claim 73 further comprising means, responsive to said calculated coupler forces, for indicating a correction to said manually adjustable throttle.

77. A method for displaying railway train coupler forces comprising:
providing data related to track profile for a predetermined section of track and data related to train consist;
generating a first signal representative of a speed of a train represented by said train consist data;
providing a second signal, responsive to said first signal, said second signal being representative of a location of said train with respect to said provided section of track profile data;
generating a third signal related to a setting of a manually adjustable throttle, said third signal being representative of the locomotive tractive effort of an engine of said train;
generating a fourth signal related to a setting of a manually adjustable brake controller, said fourth signal being representative of the braking force of the train brakes of said train;
calculating train coupler forces responsive to said track profile data, train consist data, train speed signal, train location signal, locomotive tractive effort signal, and train braking signal; and
displaying in real time the calculated train coupler forces as individual force magnitudes relative to the train consist of the represented train.

78. The method of claim 77 further comprising:
generating a fifth signal related to a setting of a manually adjustable locomotive brake controller, said fifth signal being representative of the braking force of the locomotive independent brakes of said train; and
calculating said train coupler forces additionally responsive to said locomotive independent braking signal.

79. The method of claim 77 further comprising displaying a portion of the track profile relative to the displayed coupler forces, wherein said track profile is displayed responsive to said train location signal.

80. The method of claim 79 further comprising adjusting the setting of said adjustable throttle responsive to said displayed coupler forces.

81. An apparatus for facilitating operation of a railway train comprising:
means for providing data related to track profile for a predetermined section of track and data related to train consist;
means for generating a first signal representative of a speed of a train represented by said train consist data;
means for providing a second signal, responsive to said first signal, said second signal being representative of a location of said represented train with respect to said provided section of track profile data;
means for generating a third signal related to a setting of an adjustable throttle, said third signal being representative of the locomotive tractive effort of an engine of said represented train;
means for generating a fourth signal related to a setting of an adjustable brake controller, said fourth signal being representative of the braking force of the train brakes of said represented train;

means for calculating train coupler forces responsive to said track profile data, train consist data, train speed signal, train location signal, locomotive tractive effort signal, and train braking signal; and means, responsive to said calculated coupler forces, for indicating in real time a correction to said adjustable throttle, thereby facilitating control of said represented train.

82. A method of facilitating operation of a railway train comprising:

providing data related to track profile for a predetermined section of track and data related to train consist;

generating a first signal representative of a speed of a train represented by said train consist data;

providing a second signal, responsive to said first signal, said second signal being representative of a location of said represented train with respect to said provided section of track profile data;

generating a third signal related to a setting of an adjustable throttle, said third signal being representative of the locomotive tractive effort of an engine of said represented train;

generating a fourth signal related to a setting of an adjustable brake controller, said fourth signal being representative of the braking force of the train brakes of said represented train;

calculating train coupler forces responsive to said track profile data, train consist data, train speed signal, train location signal, locomotive tractive effort signal, and train braking signal; and responsive to said calculated coupler forces, indicating in real time a correction to said adjustable throttle, thereby facilitating control of said represented train.

* * * * *

UNITED STATES PATENT OFFICE
CERTIFICATE OF CORRECTION

Patent No. 4,042,810  Dated August 16, 1977

Inventor(s) John E. Mosier

It is certified that error appears in the above-identified patent and that said Letters Patent are hereby corrected as shown below:

On the title page the inventor's name should be corrected to read -- John E. Mosier --

Column 5, line 51, "or" should read -- of --

Column 6, line 12, "unis" should read -- unit --

Column 11, line 16, the number "501" should read -- 504 --

Column 14, line 31, "undated" should read -- updated --

Column 15, line 52, "constant" should read -- consist --

UNITED STATES PATENT AND TRADEMARK OFFICE
CERTIFICATE OF CORRECTION

PATENT NO. : 4,042,810

DATED : August 16, 1977

INVENTOR(S) : John E. Mosier

It is certified that error appears in the above-identified patent and that said Letters Patent are hereby corrected as shown below:

In column 16, line 38, "bars" should read --cars--

In column 16, line 42, "$R_{RBAn}$" should read --$F_{RBAn}$--

In column 17, line 42, "indulating" should read --undulating--

In column 17, line 50, "rain" should read --train--

In column 19, line 24, "indiates" should read --indicates--

In column 19, line 45, "ears" should read --cars--

In column 19, line 67, "rain" should read --train--

In column 20, line 10, "train" should read --trail--

In column 21, line 21, "rain" should read --train--

In claim 43 at column 31, line 55, "storage" should read --stored--

In claim 45 at column 32, line 7, the number "82" should read --41--

UNITED STATES PATENT AND TRADEMARK OFFICE
CERTIFICATE OF CORRECTION

PATENT NO. : 4,042,810
DATED : August 16, 1977
INVENTOR(S) : John E. Mosier

It is certified that error appears in the above-identified patent and that said Letters Patent are hereby corrected as shown below:

In claim 47 at column 32, line 50, "to" should read --for--

In claim 49 at column 33, line 35, the equation

"$M_{en} = 91.05\ W_n\ N_n = 36.36\ N_n$" should read:

--$M_{en} = 91.05\ W_n\ N_n + 36.36\ N_n$--.

Signed and Sealed this

Twenty-seventh Day of June 1978

[SEAL]

Attest:

RUTH C. MASON
Attesting Officer

DONALD W. BANNER
Commissioner of Patents and Trademarks

Disclaimer 4,042,810.—*John E. Mosier*, Duncan, Okla. METHOD AND APPARATUS FOR FACILITATING CONTROL OF A RAILWAY TRAIN. Patent dated Aug. 16, 1977. Disclaimer filed June 10, 1985, by the assignee, *Halliburton Co.*

Hereby enters this disclaimer to claims 73 through 82 of said patent.

[*Official Gazette August 27, 1985.*]